United States Patent [19]
King et al.

[11] Patent Number: 5,349,897
[45] Date of Patent: Sep. 27, 1994

[54] COFFEE BREWER METHOD AND APPARATUS

[75] Inventors: Brian L. King, Palo Alto, Calif.; Paul A. King, Montreal, Canada

[73] Assignee: Zuma Coffee Technologies, Inc., Saint-Hubert, Canada

[21] Appl. No.: 141,733

[22] Filed: Oct. 27, 1993

Related U.S. Application Data

[63] Continuation-in-part of Ser. No. 938,768, Sep. 1, 1992.

[51] Int. Cl.5 ............................................. A47J 31/32
[52] U.S. Cl. ................................... 99/289 R; 99/287; 99/289 T
[58] Field of Search ............. 99/289 R, 289 T, 289 P, 99/295, 287, 286, 323.1; 426/433

[56] References Cited

U.S. PATENT DOCUMENTS

| | | |
|---|---|---|
| 3,552,976 | 1/1971 | King . |
| 3,565,641 | 2/1971 | King . |
| 4,193,321 | 3/1980 | King . |
| 4,305,328 | 12/1981 | Kueser et al. . |
| 4,632,023 | 12/1986 | King . |
| 4,694,739 | 9/1987 | Daintrey et al. . |
| 4,709,625 | 12/1987 | Layre ............................ 99/289 R |
| 4,784,050 | 11/1988 | Cavalli ........................... 99/289 R |
| 4,791,859 | 12/1988 | King ............................. 99/289 R |
| 4,903,586 | 2/1990 | King . |

*Primary Examiner*—Robert W. Jenkins
*Attorney, Agent, or Firm*—Hill, Steadman & Simpson

[57] ABSTRACT

An apparatus for brewing coffee, tea or other beverages that has upper and lower chambers that move relative to each other. When the upper and lower chambers are joined, coffee and water are supplied to the upper brewing chamber which passes through a filter mounted on the top of the lower brewing chamber into the lower brewing chamber and the coffee grounds remain on the filter. A piston in the lower chamber forces air through the liquid to agitate it and sucks it through the filter into the lower chamber. The coffee flows from the lower chamber and then a single push rod separates the upper and lower chambers. A wiper blade then removes the coffee grounds from the filter while the chambers are separated after which the push rod reseals the upper and lower chambers together for the next brewing cycle.

21 Claims, 20 Drawing Sheets

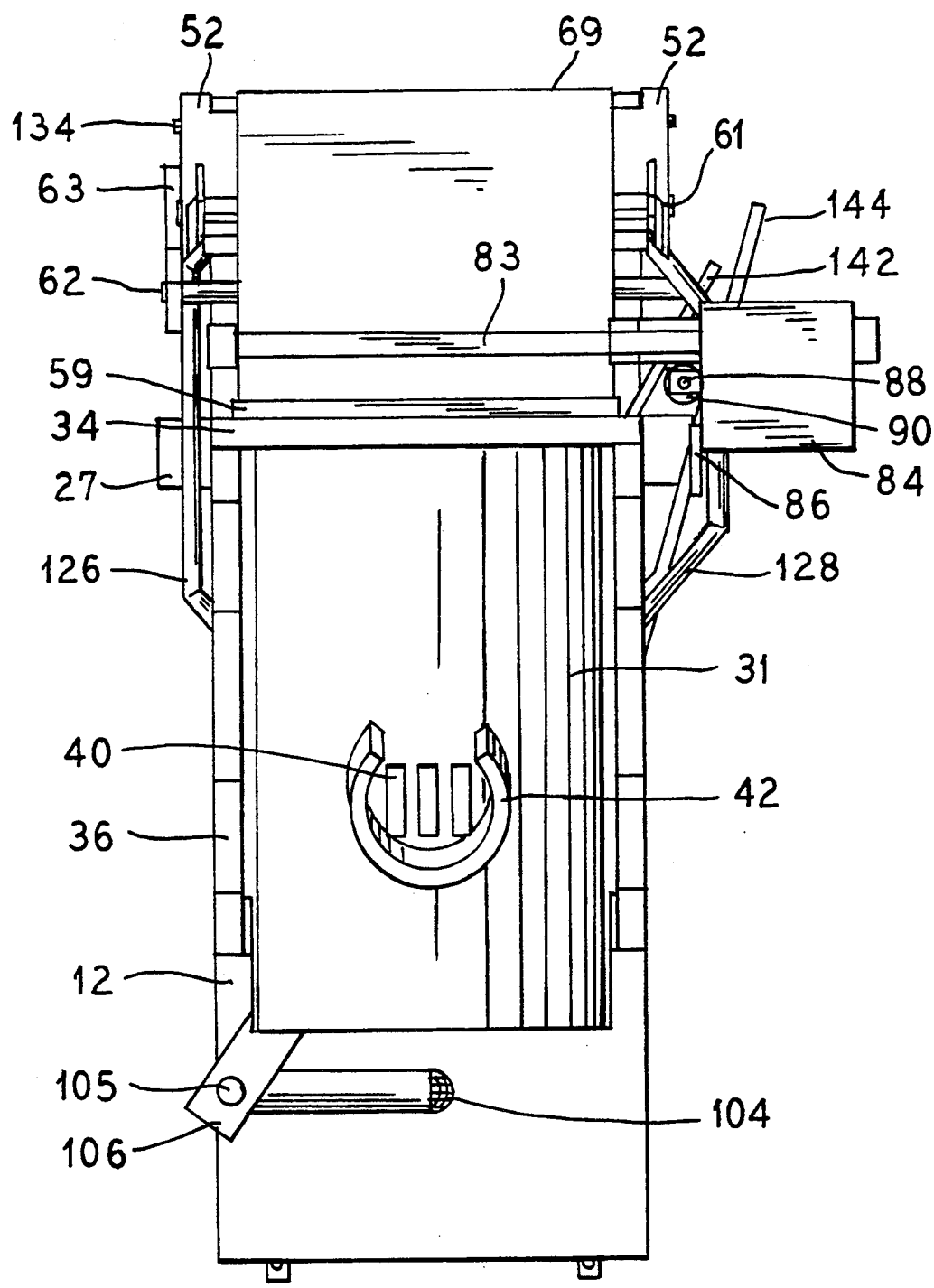

COFFEE BREWER METHOD AND APPARATUS

CROSS-REFERENCE TO RELATED APPLICATIONS

This application is a continuation-in-part of application Ser. No. 938,768, filed Sep. 1, 1992 entitled "Coffee Brewer Method and Apparatus" in which the inventors are Brian L. King and Paul A. King, assigned to the assignee of the present application.

BACKGROUND OF THE INVENTION

1. Field of the Invention

This invention relates to method and apparatus which produce coffee, tea or other beverages during a single cycle. This invention is an improvement in coffee brewing machines as it allows a filter element to be repetitively used and efficiently cleans the filter element and disposes of the grounds which allows the device to remain clean and sanitary.

2. Description of Related Art

The present invention is an improvement in single cup beverage brewers such as the ones disclosed in U.S. Pat. No. 3,565,641 issued Feb. 23, 1971, U.S. Pat. No. 4,632,023, issued Dec. 3, 1986 and U.S. Pat. No. 4,694,739 issued Sep. 22, 1987. In these apparatus the filter element consists of filter paper that cannot be reused. The present invention allows the filter element to be reused.

These patents describe methods and apparatus which produce a single cup of coffee which consists of an upper chamber that is open at the top to allow coffee and hot water to enter and be mixed. For most of the cycle the upper chamber is tightly sealed to a lower chamber with a movable filter held therebetween.

The lower chamber contains a piston which can move up and down. The piston first moves upwardly to force air through the mixture of coffee and water in the upper chamber. This air movement agitates the coffee and water. The piston then travels downward and draws the liquid coffee through the filter element. The liquid coffee is drawn down until it reaches an opening in the lower chamber and it pours out along a spout. The chambers are then separated to advance the filter, and the filtered solids consisting of coffee grounds remain on the filter element. Thus, the movable filter becomes used up and must be replaced.

The present invention is also an improvement over beverage machines, such as U.S. Pat. No. 4,903,586, which employs a reusable movable, flexible filter strip as a filter element. In this device when the lower chamber is separated from the upper chamber, the filter strip is removed from the lower chamber and the coffee residue is scraped from the filter element. The filter element is then returned to the lower chamber and is ready for the next cycle. The brewer of this latter patent involves many moving parts in order to remove the coffee grounds. In order to prevent liquids from being ejected from the upper chamber, the filter strip requires a "hold down" mechanism in the upper chamber to clamp the filter during brewing, thereby adding complexity to the brewer and additional moving parts in the most messy part of the apparatus. After each cycle is complete, the wet section of filter strip rests at the opposite side of the brewer from the side where the coffee grounds are deposited.

The prior art brewers have a method of adjusting the pressure on the upper chamber to clamp it to the lower chamber. This is done through the addition of spacers or through turning of an adjusting nut. Therefore, these brewers require proper adjustment in order to brew coffee.

SUMMARY OF THE INVENTION

It is an object of the present invention to provide a beverage brewer which allows a reusable filter element.

Another object of the invention is to allow the apparatus to be driven by turning a single shaft so that a wiper blade is positively driven in both directions over the filter without using springs which can be less reliable.

It is yet another object of the invention to have a wiper drive system which consists of as few moving parts as possible because the wiper operates in the brewing area of the apparatus which is very messy given it is mixing water and coffee grounds.

Another object of the invention is to allow the wiper blade to travel back and forth very quickly which leaves a large portion of the cycle available for agitating the coffee and water and drawing the liquid coffee through the filter element.

It is yet another object of this invention to provide for the wiper blade to be parked below the surface of the lower chamber and above the waste container for the coffee grounds so that any excess liquid or solid coffee on the wiper drips into the waste container.

Yet another object of the invention is for the brew chamber and wiper assembly to be easy to detach to allow for easy cleaning of these devices.

It is another object of the invention to allow the apparatus to accommodate a paper filter material which is not reusable and for this paper material to be removed by the wiper blade.

Yet another object of the invention is to allow the apparatus to be assembled to discard the coffee grounds to the left side or to the right side of the brewer to allow more flexibility when placing multiple brewing mechanisms in a single machine.

Broadly stated, the present invention is directed to method and apparatus for brewing a beverage having an upper chamber and a lower chamber and a filter mounted over the upper end of the lower chamber with means for separating the chambers and means for removing the brewing material off the top surface of the filter when the chambers are spaced apart from one another.

In accordance with the preferred embodiment of the present invention the removing means is a wiper assembly which moves from a stored position on one side of the chambers to a return position on the opposite side of the chambers without touching the beverage material, and then with the chambers closer together moves from the return position across the filter to the stored position, wiping the brewing material off the filter as it goes.

In another aspect of the present invention the wiper moves at a slower rate as it nears the stored position from the return position, thereby avoiding spillage of the brewing material.

In accordance with another aspect of the recent invention, the upper chamber is supported on an H-frame pivotally mounted to a support member with the pivotal mounting also including a support bar which provides a parallelogram support for the upper chamber relative to the lower chamber. A feature and advantage of this aspect of the invention is that in both travel from the stored position to the return position and from the return position to the stored position the wiper moves parallel to the surface of the filter, thereby reducing the height to which the upper chamber is lifted for the first movement of the wiper assembly, and ensures intimate contact of the wiper across the entire surface of the filter in the second movement of the wiper.

In accordance with another aspect of the present invention, spring members are provided on pull-down rods connected to the H-frame for pulling the upper chamber down toward the lower chamber and applying uniform pressure sealing the upper chamber to the filter. This construction avoids the necessity for any adjustment to maintain the seal of the upper chamber to the filter.

In another aspect of the present invention there is a brush mounted on top of the wiper. Every time the wiper travels below the upper chamber it cleans the upper chamber of any excess coffee residue. This keeps the upper chamber clean.

In another aspect of the present invention the main drive shaft of the brewer has two bends in it. This allows the main shaft to serve as a crank arm and pivot pin for the connecting rod. By eliminating the crank arm and a pivot pin used by conventional coffee brewers the mechanism is less expensive to manufacture and it is stronger.

In another aspect of the present invention, the piston is made of a sleeve made of a slippery plastic such as Teflon which is constrained by a two piece piston. The slippery plastic is forced against the side of the upper chamber by an O ring. Conventional brewers use a slippery seal made of an upside down cup of slippery plastic which covers the top of the piston. By eliminating the cup, this invention allows the top of the piston to be shaped to mate with the top of the lower chamber. This eliminates any excess air and therefore increases the liquid brewing capacity of the device. It also allows the top of the piston to be shaped so as to drain the lower chamber more completely by adding a front notch or by sloping the top of the piston towards the opening in the lower chamber.

In another aspect of the present invention, the coffee and water are guided into the upper chamber by a mixing chute and spillage chute. Conventional brewers use a circular funnel to mix the coffee and water. Using a mixing chute creates a more efficient mix of the coffee and water and it also prevents coffee and water from being ejected from the upper chamber by the upstroke of air.

In another aspect of the invention, the upper brewing chamber is moved by a single rod mounted behind the wiper.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

BRIEF DESCRIPTION OF THE DRAWINGS

FIG. 3A is a front elevational view of the brewing apparatus in the home position;

DETAILED DESCRIPTION OF THE PREFERRED EMBODIMENTS

Figure 1:
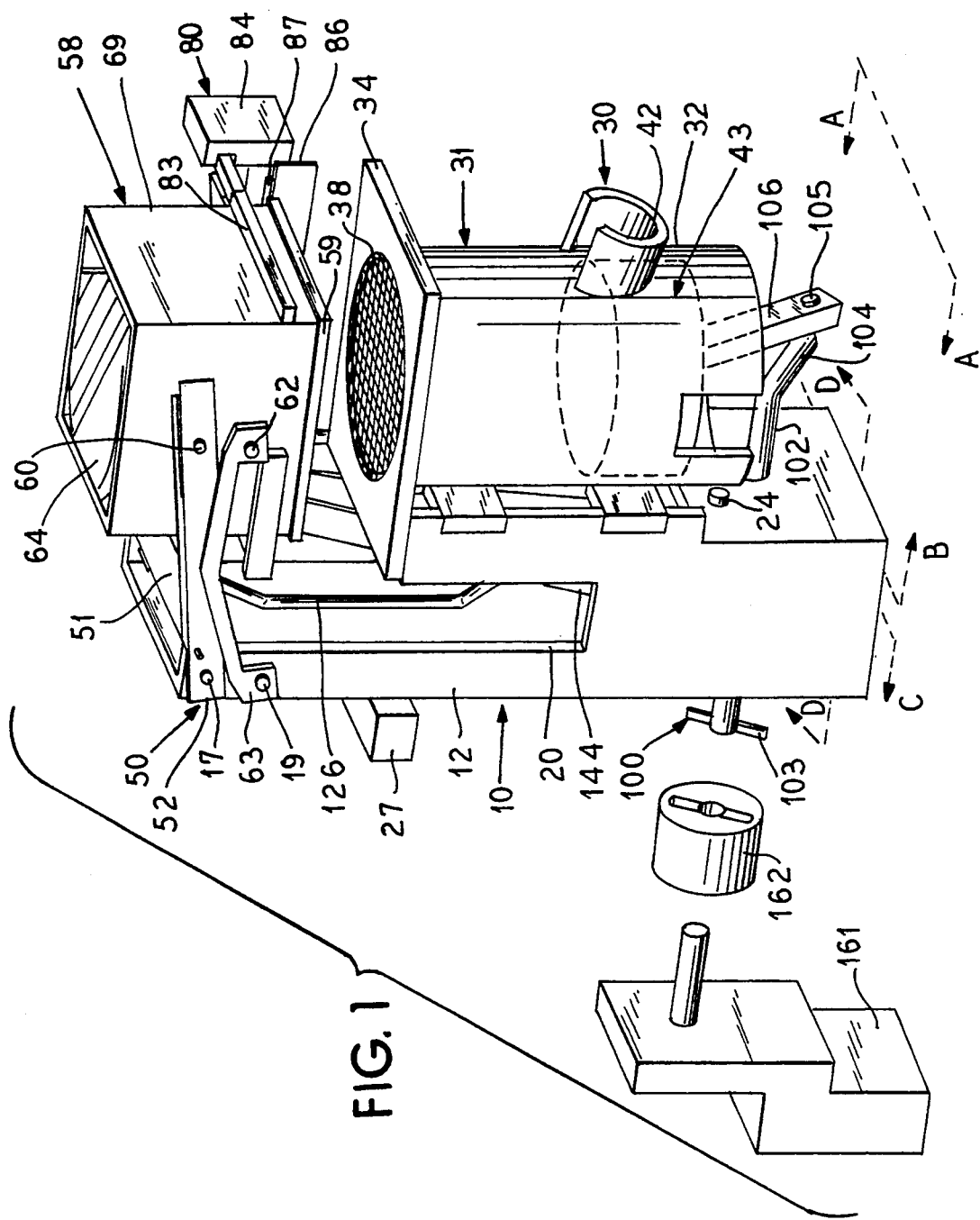
FIG. 1 is a perspective view illustrating the brewing apparatus of the present invention.

Referring now to the drawings, with particular reference to FIGS. 1-5, the preferred embodiment of the present invention includes a main support assembly 10 on which are mounted a lower chamber assembly 30, an upper chamber assembly 58 with its associated wiper assembly 80, and the drive assembly 100 with its associated upper chamber elevating assembly 120 and wiper drive assembly 140.

The main support assembly 10 includes an upright channel or main support member 12 housing the drive assembly 100, upper chamber elevating assembly or pull down assembly 120 and wiper drive assembly 140. In its front and rear walls the support member 12 includes shaft supports 14 for the main drive shaft 102, and near the upper end of the side walls of support member 12, adjacent the rear wall thereof, openings 16 support an upper chamber assembly pivot shaft 17 positioned horizontally and parallel to the support member rear wall. Below support openings 16 are openings 18 supporting a pivot shaft 19 for mounting a support bar 63 described in greater detail below. A pair of openings 21 and 23 are provided above opening 14 in the support member 12 for receiving pivot shafts 22 and 24, respectively, to be described in greater detail below.

Elongate openings 20 are provided in the sidewalls of the support member 12 to provide clearance for the wiper assembly 80, wiper drive assembly 140 and pull down assembly 120 which are described in greater detail below.

Figure 2:
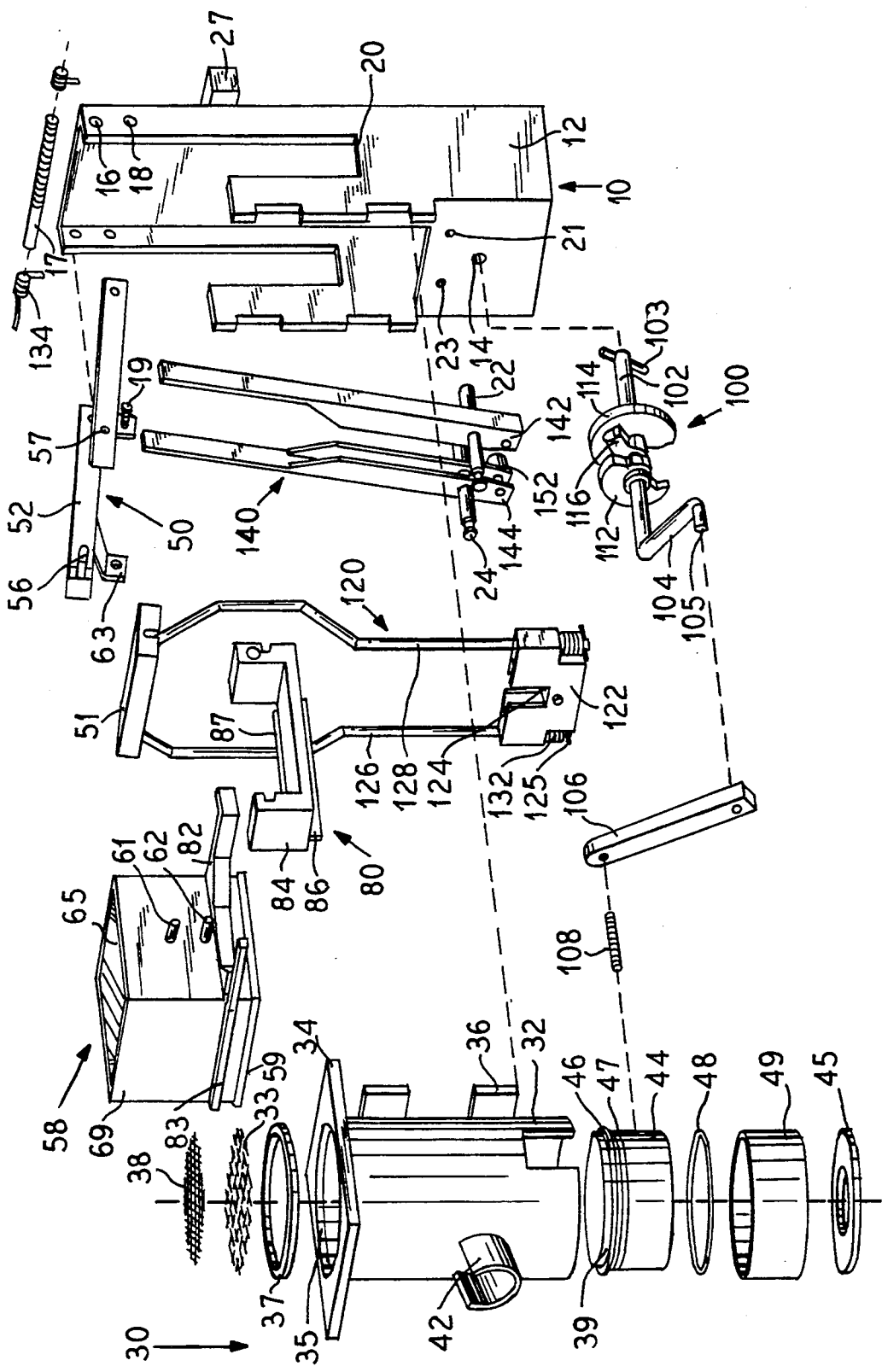
FIG. 2 is an exploded perspective view of the apparatus shown in FIG. 1.

The lower chamber assembly 30 is firmly attached to the support member 12 by side members 36 and includes a lower chamber 31 and a piston assembly 43. The lower chamber 31 consists of a hollow cylinder 32 having at the open upper end thereof a top plate 34. The top plate 34 has a groove 35 that fits a support gasket 37. As best shown by FIG. 2, the support gasket 37 holds a support plate 33 and a flexible filter 38 to the top plate. The flexible filter 38 is attached to the support plate and filter 38 is made of material such as of nylon mesh that passes water but prevents passage therethrough of brewing materials such as coffee grounds. The support plate 33 supports the flexible filter 38 and has large openings that allow liquids to pass through. The hollow cylinder 32 includes at least one opening 40 which is surrounded by a spout 42 for delivering the brewed coffee into a cup therebelow.

Figure 7:
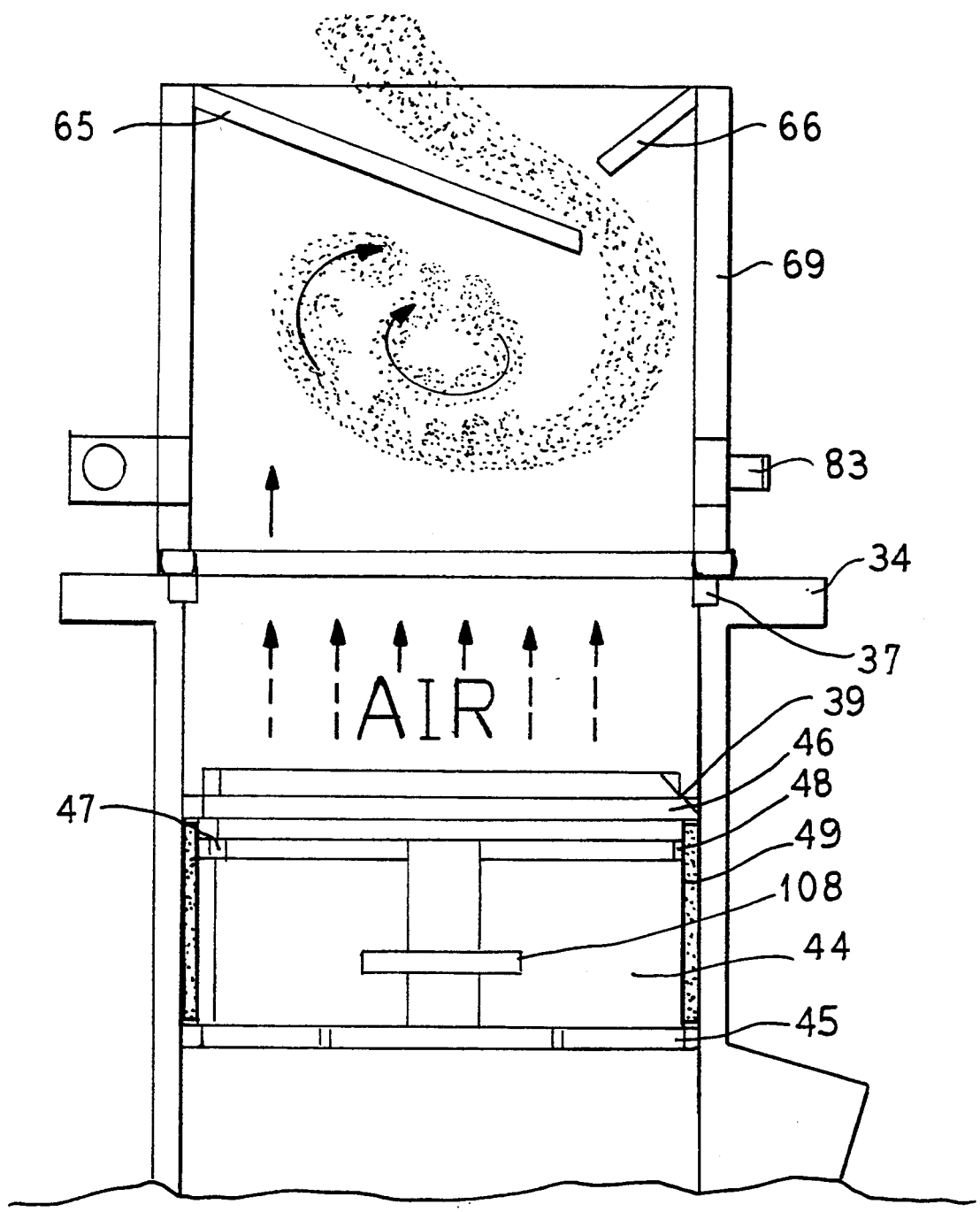
FIG. 7 is an illustrative drawing which shows the coffee grounds and hot water being agitated by the air upstroke, creating a swirl that allows the brewing to occur rapidly and efficiently.

As best shown by FIGS. 2 and 7, the piston assembly 43 consists of a body 44 and a lower cap 45. The body is a cylinder with a top ridge 46 that captures therebelow a slipper sleeve 49. Below the ridge 46, the body has a peripheral groove 47 that accommodates an 0 ring 48. The 0 ring 48 forces the slippery sleeve 49 to make a tight seal with the hollow cylinder 32 as it slides up and down in the lower chamber 31. The cap 45 is at the bottom of the piston assembly 43 and is fastened tightly to the piston body 44 and captures the slippery sleeve 49. The slippery sleeve 49 is made of Teflon or similar plastics. As best shown by FIG. 7, the top of the piston body 44 is shaped to mate with the upper portion of the lower chamber 31 when the piston is at the top of its travel. Therefore, there is a minimal air gap between the piston assembly 43 and the lower chamber 31 which maximizes the liquid brewing capacity of the device. The front of the piston has a notch 39 which allows liquids to drain from off the top of the piston more completely. The top of the piston 43 can also have a gentle slope towards the opening 40 of the cylinder 32 which helps the coffee drain more completely. The piston assembly 43 is driven up and own in the lower chamber by a connecting arm 106 which is driven by an extension of the drive shaft 102.

Figure 4A:
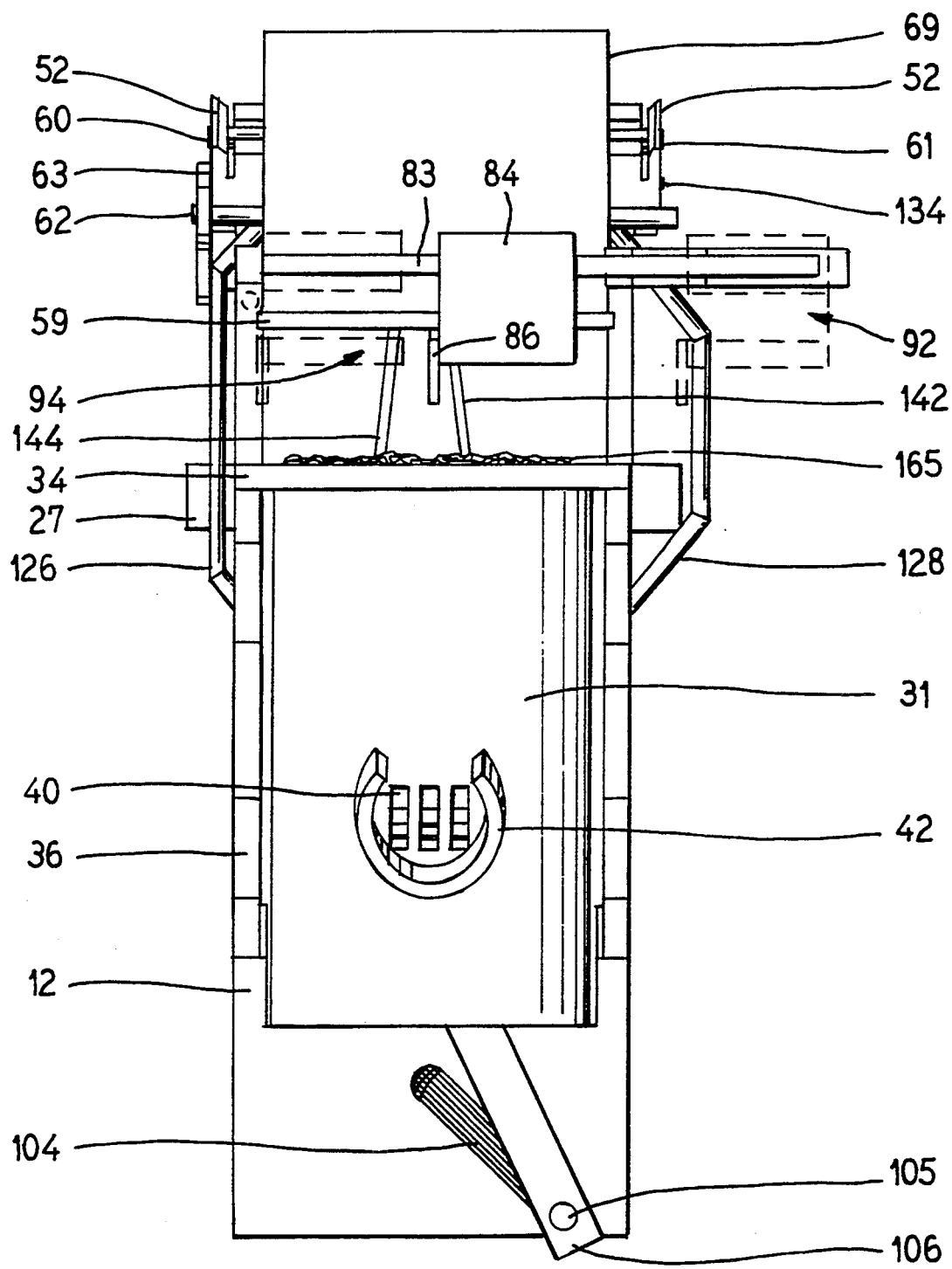
FIGS. 4A, 4B and 4C are views similar to FIGS. 3A, 3B and 3C but illustrating the position of the elements as the wiper is moving from the stored position to the return position and illustrating in phantom the position of the wiper in the stored and return positions.
Figure 4B:
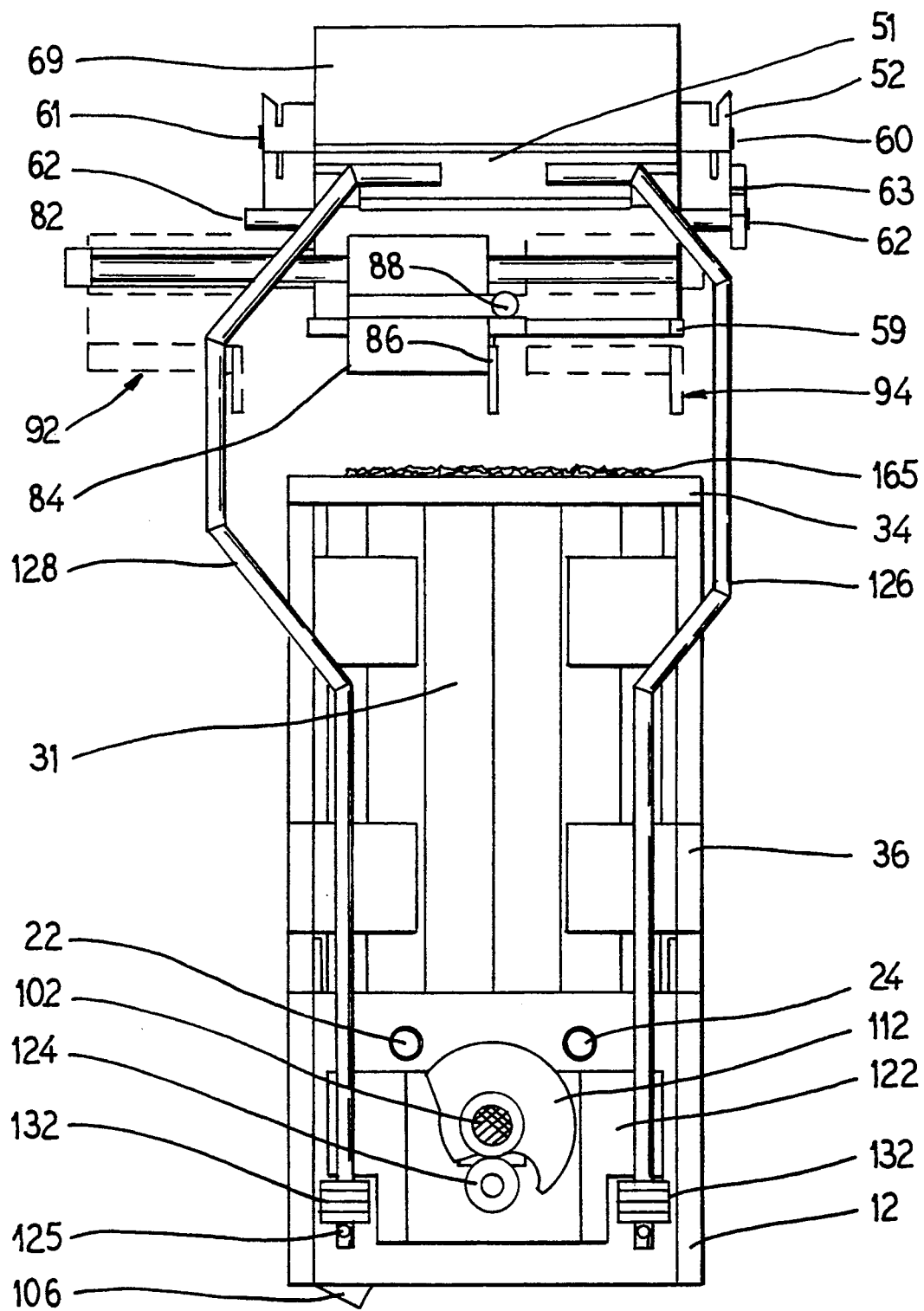
Figure 4C:
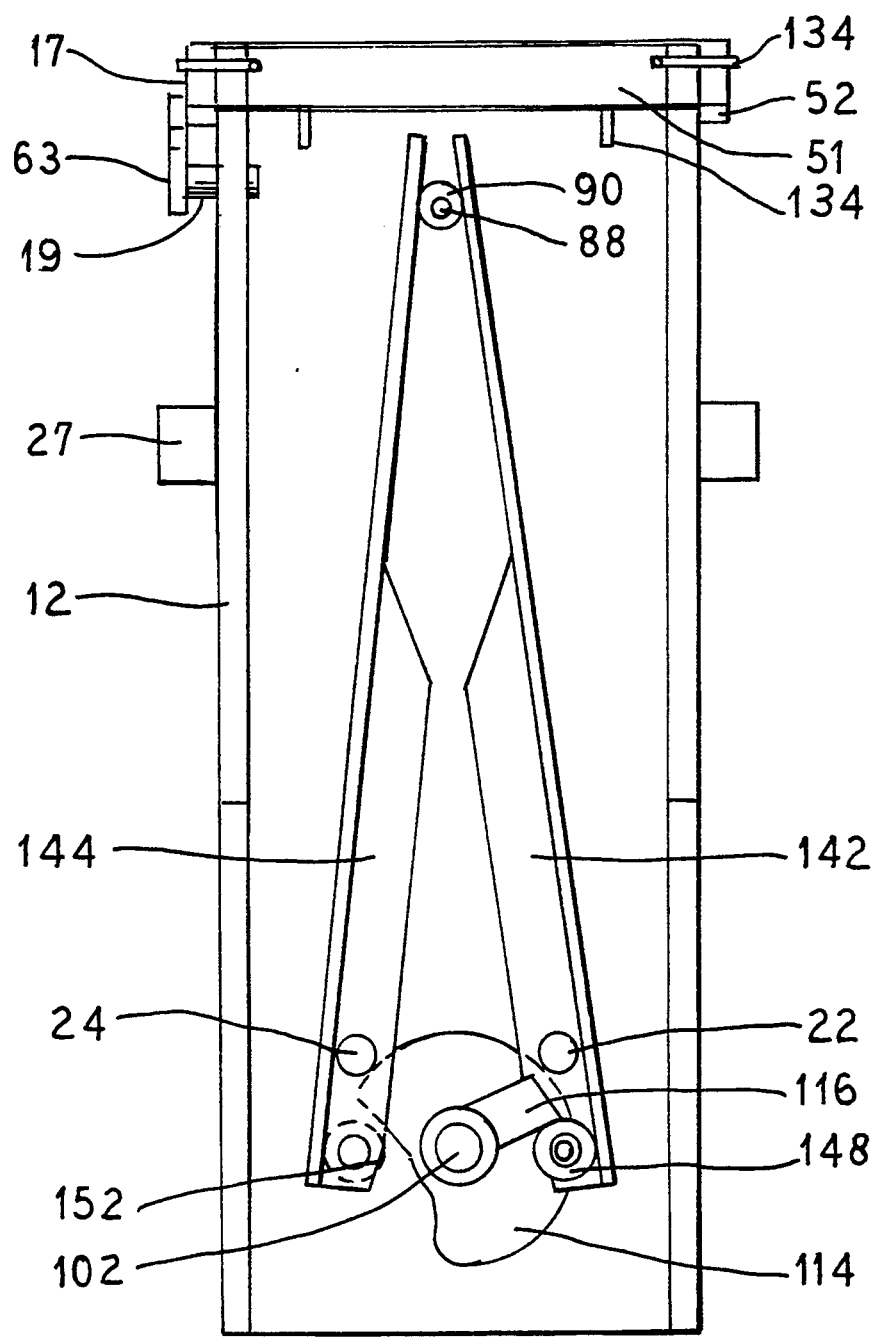
Figure 4D:
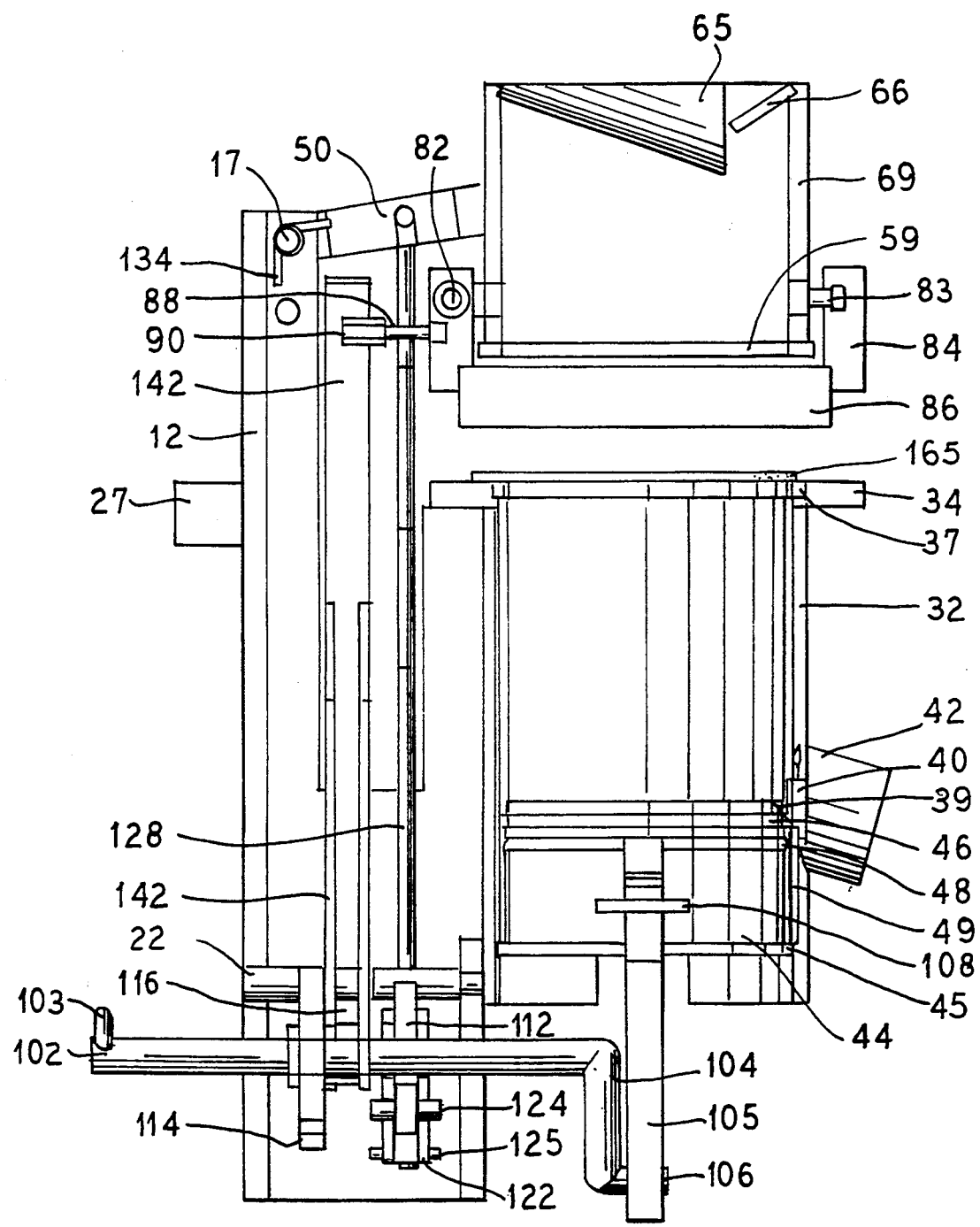
FIG. 4D is a sectional view of the apparatus taken along line D—D in FIG. 1 in the direction of the arrows with the device in the position shown in FIG. 4A.

As best shown in FIGS. 1, 2 and 4D, the drive shaft 102 projects through the front of support member 12. The front of the drive shaft 102 has two ninety degree bends that form a crank shaft 104 and a pivot shaft 105 that engages the connecting arm 106.

Figure 6:
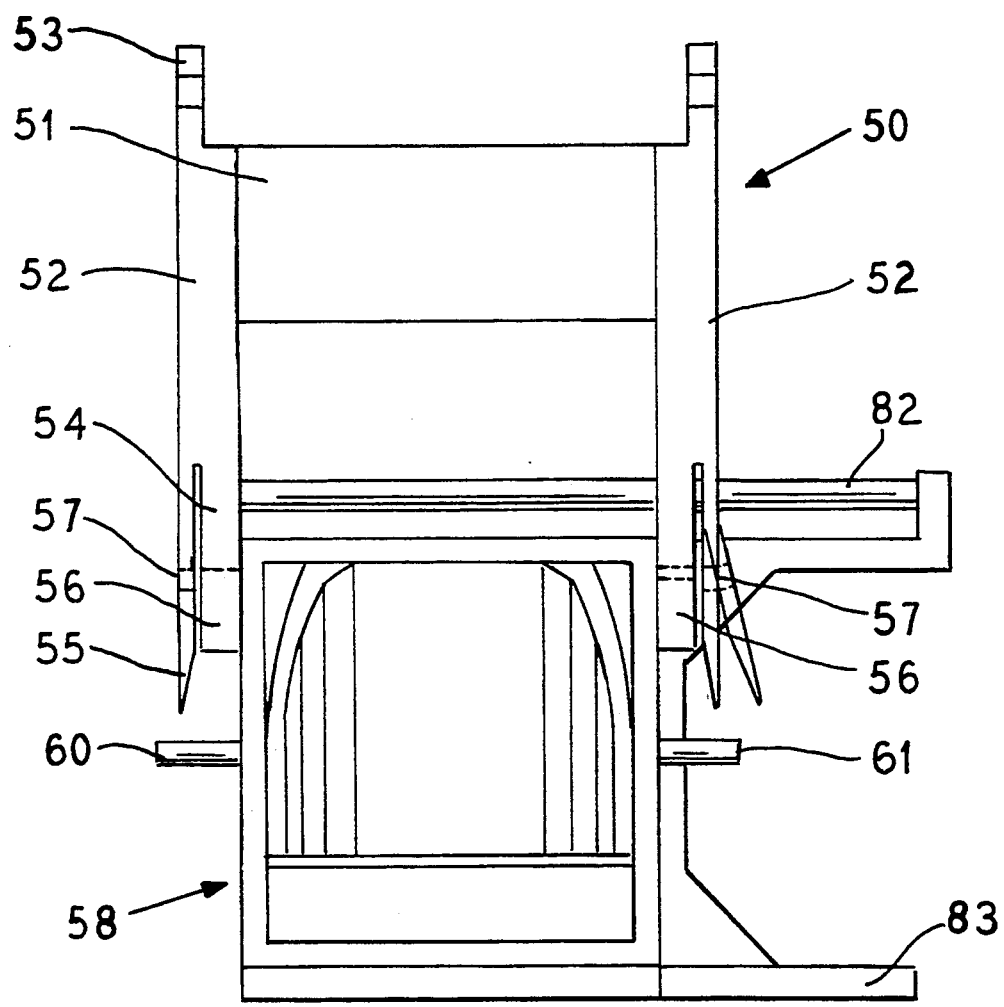
FIG. 6 is a plan view of the upper chamber separated from its support H-frame and illustrating in phantom the flexible movement of the H-frame arm.

As best shown in FIGS. 2 and 6, the H-frame assembly 50 consisting of a H-frame body 51 and sides 52. The sides 52 of the "H" have ends 53 toward the rear of the brewer pivotally mounted on pivot shaft 17. The other or forward end of the sides 52 of the H-frame 51 are slotted longitudinally with a wider rigid portion 54 of the sides 52 located inwardly of the "H", and narrower portions 55 outwardly thereof which are flexible outwardly from the sides of the "H". Horizontal slots 56 extend rearwardly from the front ends of the inner portions 54 of the sides of the "H". At the rear ends of the slots 56, horizontal holes 57 are provided in the narrow portion 55 to pass the ends of stub shafts 60 and 61 positioned on the outer sides of the upper chamber assembly 58 as described below.

The upper chamber assembly 58, which receives the brewing materials and hot water, has a gasket 59 that seals against the support gasket 37 of the lower chamber 31 when the lower end of the upper chamber 58 is brought down to the upper end of the lower chamber 31.

The top of upper chamber assembly 58 consists of a mixing chute 65 and a spillage chute 66. The mixing chute 65 directs the coffee and hot water into the upper chamber 69 so that they mix quickly and efficiently. The spillage chute 66 directs any spilled coffee and water into the upper chamber.

The upper chamber 69 has a pair of stub shafts 60 and 61 projecting out of opposite sides thereof for removable slidable insertion in the slots 56 of the forward ends of the H-frame sides 52 as the outer portions 55 are flexed outwardly so that the stub shafts 60 and 61 are held in the holes 57 when the other portions 55 are released with the stub shafts aligned with the holes 57.

A support bar 63 connects between the shaft 19 and the stub shaft 62 which is connected to the upper chamber 58. The stub shaft 62 is provided on both sides of the upper chamber 58 which allows the support bar 63 to be assembled on either side of the upper chamber. The distance between shafts 17 and 19 is equal to the distance between the stub shafts 60 and 62, and the distance from the connection of support bar 63 to shaft 19 and to stub shaft 62 is equal to the distance from the connection of the side 52 of the H-frame to pivot shaft 17 to stub shaft 60 so that the support bar 63 and the adjacent side 52 of the H-frame form a parallelogram which maintains the chamber 69 level as the upper chamber assembly 58 is raised and lowered relative to the lower chamber assembly 30. In the lower position of the upper chamber assembly 58, the vertical axes of the lower chamber 31 and upper chamber 69 are coaxial, and as the upper chamber is raised, its axis remains vertical and parallel to the axis of the lower chamber 31.

The wiper assembly 80, attached to the upper chamber assembly 58, includes parallel and spaced-apart rear shaft 82 and front guide 83 (See FIG. 4D) which provide, respectively, a linear bearing surface and a guide for a transversely extending wiper bracket 84. A wiper blade 86 is mounted on the wiper bracket 84, and the wiper bracket and blade can therefore slide together under the upper chamber 69. The wiper blade 86 will always remain parallel to the filter 38 as the upper chamber 69 is moved relative to the lower chamber 31 by reason of the parallelogram support of the upper chamber 58 to the support member 12.

A top brush or wiper 87 is mounted on the wiper bracket. When the wiper bracket 84 slides under the upper chamber 69 the top brush 87 cleans the upper chamber 69 of excess coffee residue.

As best shown by FIG. 4D, a stub shaft 88 projects rearwardly from the wiper bracket 84 and supports a sleeve bearing 90 for transverse movement of the wiper bracket 84 from the stored position 92 on one side of the upper chamber assembly 58 to a return position 94 on the other side of the upper chamber, as shown in phantom in FIGS. 4A and 4B.

The drive assembly for elevating and lowering the upper chamber assembly via the elevating assembly 120 and moving the wiper assembly via the wiper drive assembly 140 are illustrated in FIGS. 1 through 5. In the drive assembly 100 at the opposite end of the drive shaft 102 from the crank arm 104, a pin 103 is driven by an electric motor 161 and a coupling member 162. Main drive shaft 102 includes a pull-down cam 112 for operating the upper chamber elevating assembly 120 and a return cam 116 and a wipe cam 114 for operating the wipe drive assembly 140 (see FIG. 2).

The upper chamber elevating assembly or pull-down assembly 120 includes a pull-down frame 122 on which is mounted a roller 124 which engages the pull-down cam 112. A pair of pull-down rods 126 and 128 slide axially in holes in the pull-down frame 122. Compressible rubber or metal springs 132 are trapped between the pull-down frame 122 and the stop pins 125 of the pull-down rods 126 and 128. When the pull-down frame 122 moves downwardly the pull-down springs 132 compress and force the pull-down rods 126 and 128 to move downwardly. The pull-down rods 126 and 128 extend upwardly and are angled outwardly through the side wall openings 20 in the support member 12 and the upper ends of the pull-down rods 126 and 128 are bent horizontally to fit into openings in the H-frame body 51.

The H-frame assembly 50 and pull-down rods 126 and 128 and pull-down frame 122 are biased upward by lift springs 134 mounted on the upper chamber assembly pivot shaft 17. One end of the lift spring 134 acts upon the support member 12 and the other end acts upon the H-frame side 52. This forces the H frame assembly 50 upwards so that during elevation the upper chamber can be positioned at a first higher position at which the traveling wiper bracket will clear a cake of coffee grounds 165 on flexible filter 38, and at a second elevated but lower position the wiper blade 86 will be in contact with the filter 38 for wiping the coffee grounds from the surface of the filter 38. Pull-down cam 112, when rotated, forces the H frame assembly 50 to pivot around shaft 17, countering the action of lift springs 134, which bias the H-frame upwards.

With particular reference to FIGS. 2, 3C, 4C and 5C, the wiper drive assembly 140 includes an elongate return lever 142 pivotally mounted on the pivot shaft 22, and extending upwardly so that its upper end engages the sleeve bearing 90 for moving the wiper assembly from the stored position 92 to the return position 94. The bottom of the return lever 142 supports a cam follower 148. The cam follower 148 is driven by the return cam 116. Therefore, return cam 116 pivots the return lever 142 which forces the wiper bracket 84 to travel from the stored position 92 to the return position 94. Similarly, wipe lever 144 is pivoted on pivot shaft 24 so that the upper end of wipe lever 144 will engage the sleeve bearing 90 to move the wiper bracket 84 from the return position 94 to the stored position 92. The bottom of wipe lever 144 supports a cam follower 152 which is driven by the wipe cam 114. Therefore, wipe cam 114 pivots the wipe lever 144 which forces the wiper bracket 84 to travel from the return position to the stored position.

Figure 3B:
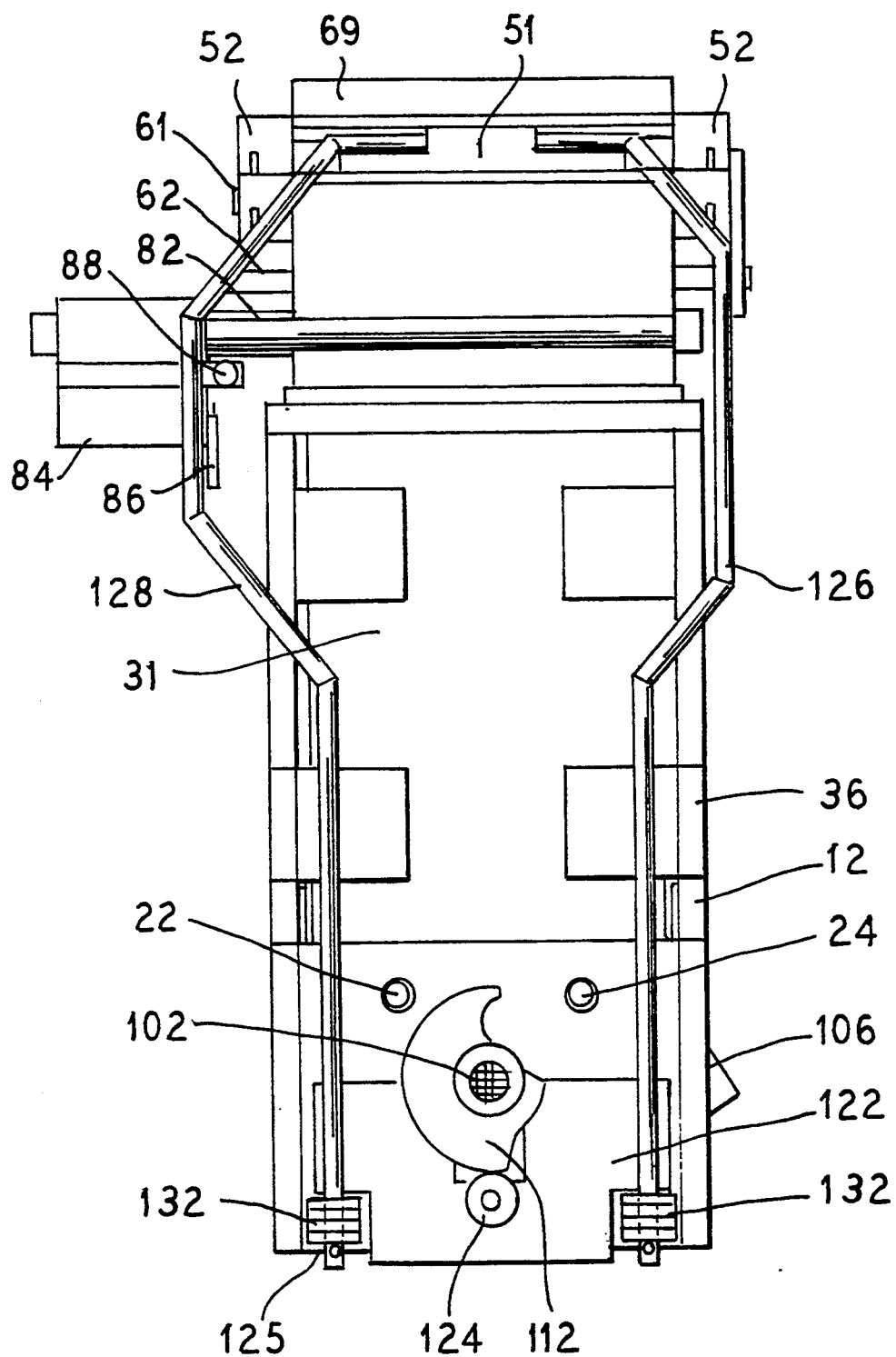
FIG. 3B is an elevational sectional view taken along line B—B in FIG. 1 in the direction of the arrows illustrating the position of the pull-down mechanism in the home position.
Figure 3C:
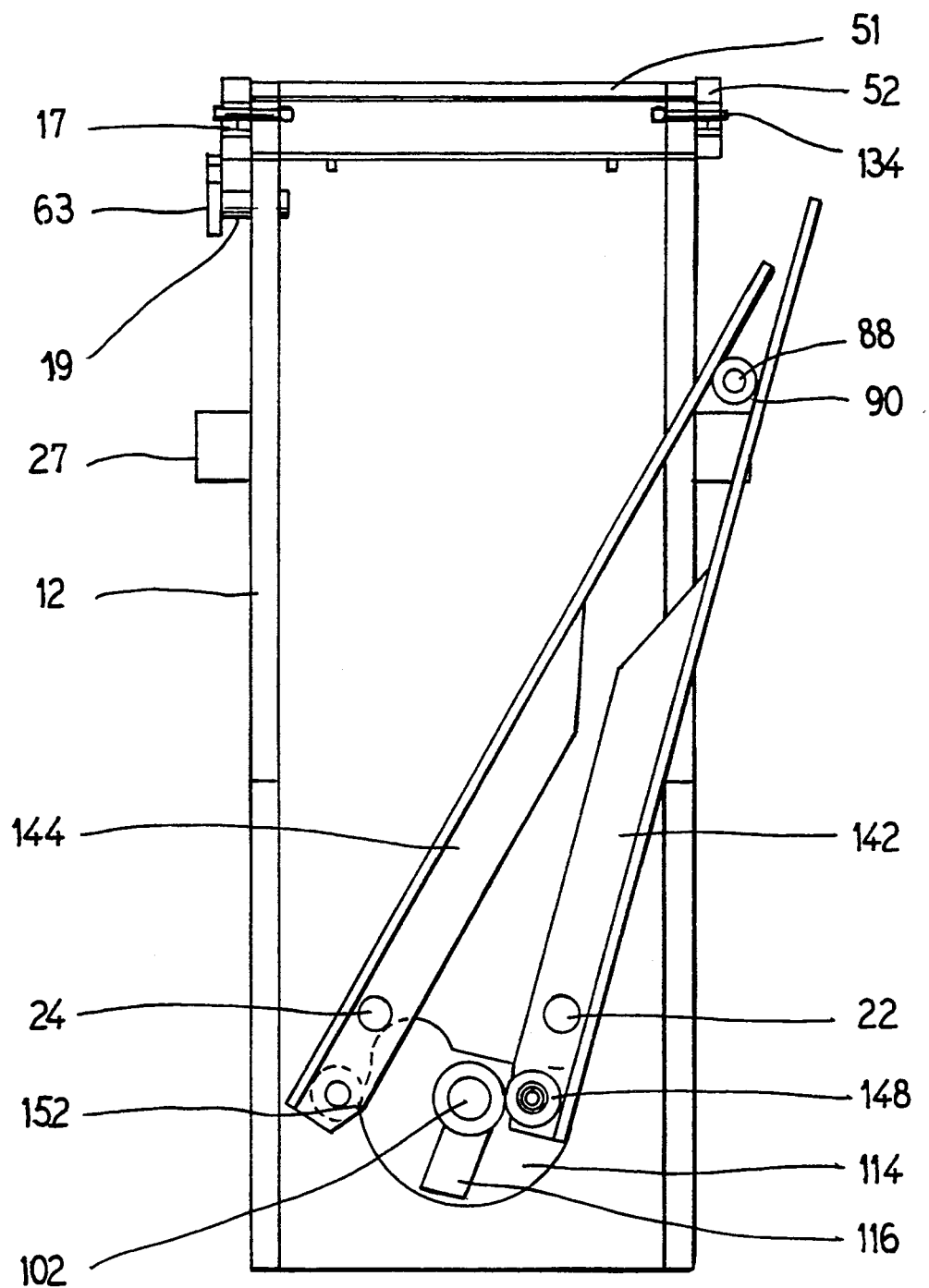
FIG. 3C is an elevational sectional view taken along line C—C in FIG. 1 in the direction of the arrows illustrating the position of the wiper drive mechanism in the home position.

Prior to the beginning of an operative cycle, the upper chamber 58 is clamped down and sealed against the lower chamber 31 in the position shown in FIGS. 3A, 3B and 3C. In operation, when the dispenser machine is activated the electric motor 161 and coupling 162 of the dispenser machine turns the drive shaft 102 in one direction. The drive shaft 102 is usually turned at a constant rate. It can however be driven by a variable speed electric motor. Rotating the drive shaft 102 forces the connecting arm 106 to push the piston 43 up and down in the cylinder 32. Coffee is dispensed onto the mixing chute 65 and hot water is then dispensed so as to wash the coffee into the upper chamber. The piston 43 starts from a position just above the opening 40 of the lower chamber 31 and travels upwardly forcing air through the filter material 38. The mixing chute 65 is angled so as to deliver the coffee and water mixture to the side of the upper chamber 69. FIG. 7 shows how the delivery position of this mixture and the air forced upwards by the piston 43 creates a swirl that causes the coffee to brew rapidly and efficiently. The mixing chute 65 and spillage chute 66 also form a barrier that prevent the air jet from ejecting any coffee and liquids from the upper chamber.

During this time, the upper chamber 58 is firmly held against the lower chamber 31 so that the gasket 59 seals the upper chamber 58 to the lower chamber 31. The piston 43 travels to the top of the lower chamber 31 and then moves downwardly in lower chamber 31 to draw the liquid coffee through the filter material 38 and into the lower chamber 31, leaving the coffee grounds 165 on the filter material 38. As the piston 43 continues downwardly, it draws the liquid coffee down to the opening 40 of the lower chamber 31 where the coffee exits from the lower chamber 31 and travels down the spout 42 and exits the brewing mechanism. The notch 39 allows the coffee to drain more quickly and more completely from the top of the piston.

The drive shaft 102 continues to rotate and the pull-down cam 112, the return cam 116 and the wipe cam 114 begin to operate together to make the wiper blade 86 scrape the coffee residue from the filter material 38.

The pull-down cam 112 releases the roller cam follower 124 which releases the pull-down frame 122 which allows the pull-down springs 132 to release the pull-down rods 126 and 128, thereby causing the upper chamber 58 to rise due to the lift springs 134. The upper chamber 58 rises parallel to the lower chamber and filter 38 de to the parallelogram formed by one side 52 of the H-frame 50 and the support bar 63. The upper chamber 58 travels upward to a first upper position shown in FIG. 5, where the wiper blade 86 is higher than the coffee residue 165.

The return cam 116 then engages the cam follower 148 at the bottom of the return lever 142, which causes the return lever to pivot around the pivot shaft 22 so that the upper end of the return lever engages the sleeve bearing 90 and in turn the stub shaft 88 of the wiper bracket 84, thereby forcing the wiper bracket 84 to slide along the shaft 82 and front guide 83 of the upper chamber assembly 58. The wiper blade 86 is kept parallel to the lower chamber 31, allowing the wiper blade 86 to travel above the coffee residue 165, as shown in FIGS. 4A and 4B. The top brush 87 acts upon the upper chamber 69 and cleans off any excess residue. The stub shaft 88 of the wiper bracket 84 engages the sleeve bearing 90 which engages the top of the wipe lever 144. This causes the wipe lever 144 to rotate around pivot shaft 24, which the wipe lever 1444 is free to do because the wipe cam 114 has a dwell so it no longer acts upon the cam follower 152 of the wipe lever 144.

Figure 5A:
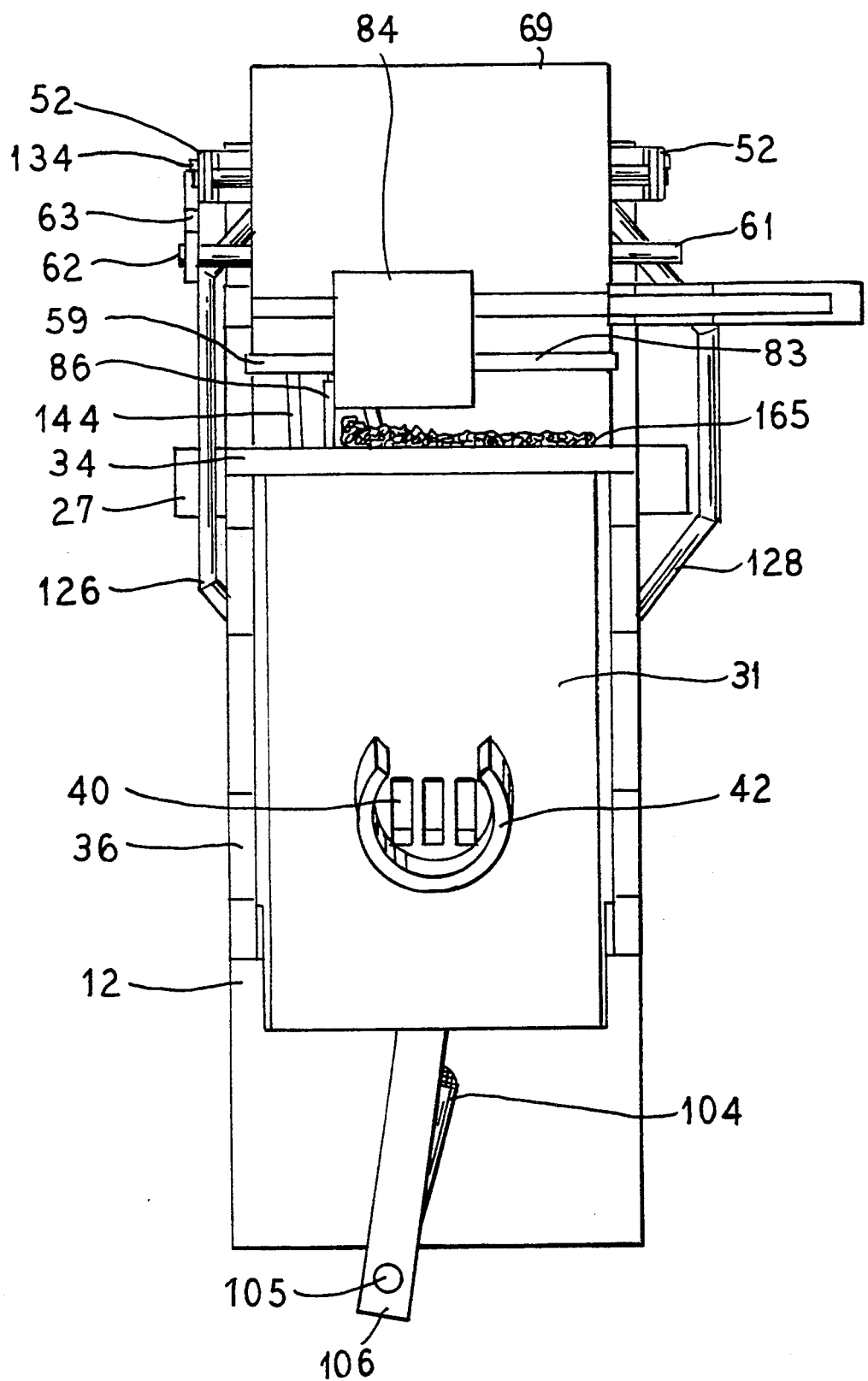
FIGS. 5A, 5B and 5C are views similar to FIGS. 3A, 3B and 3C but illustrating the position of the elements as the wiper is moving from the return position to the stored position and scraping the brewing material off of the filter element.
Figure 5B:
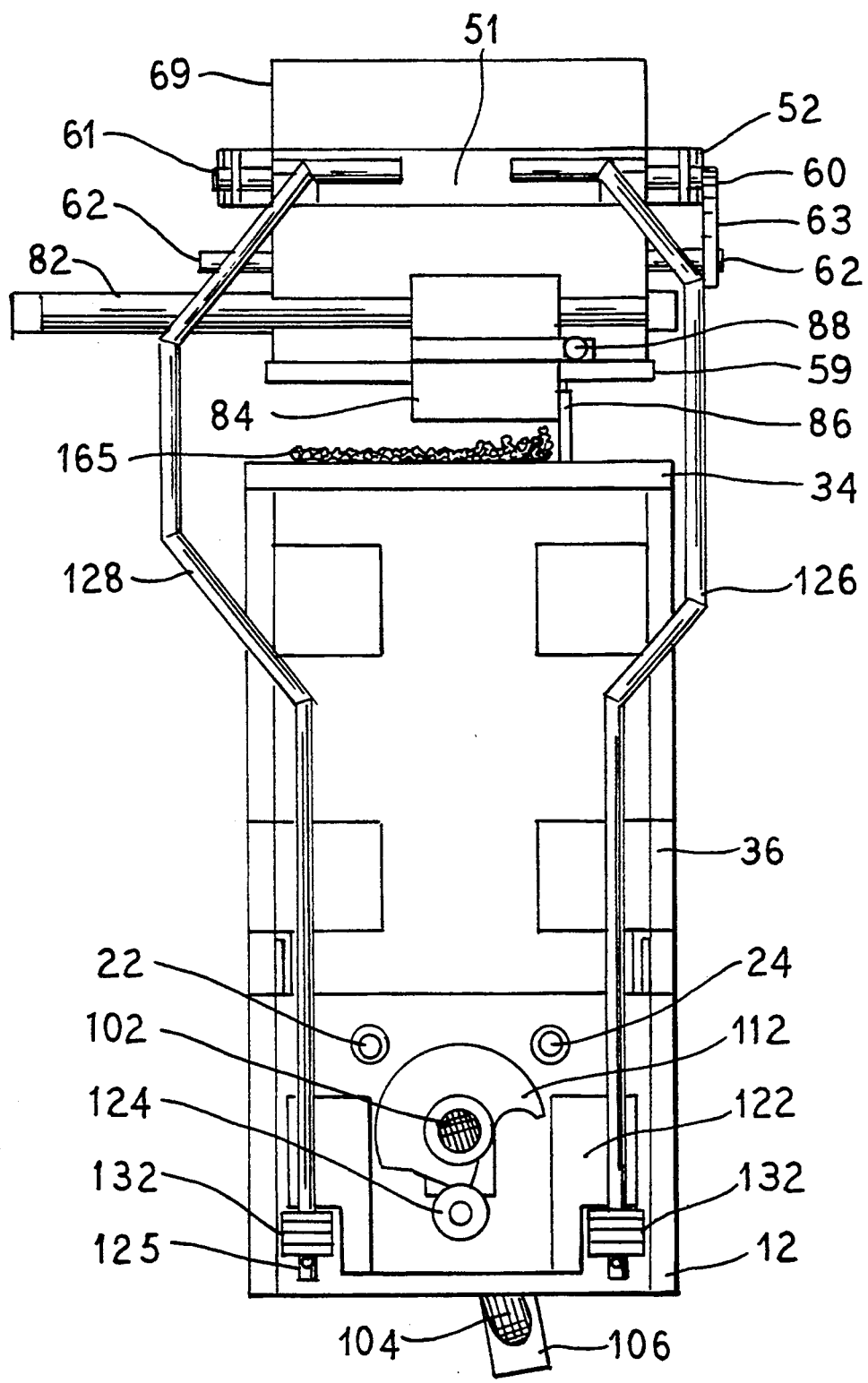
Figure 5C:
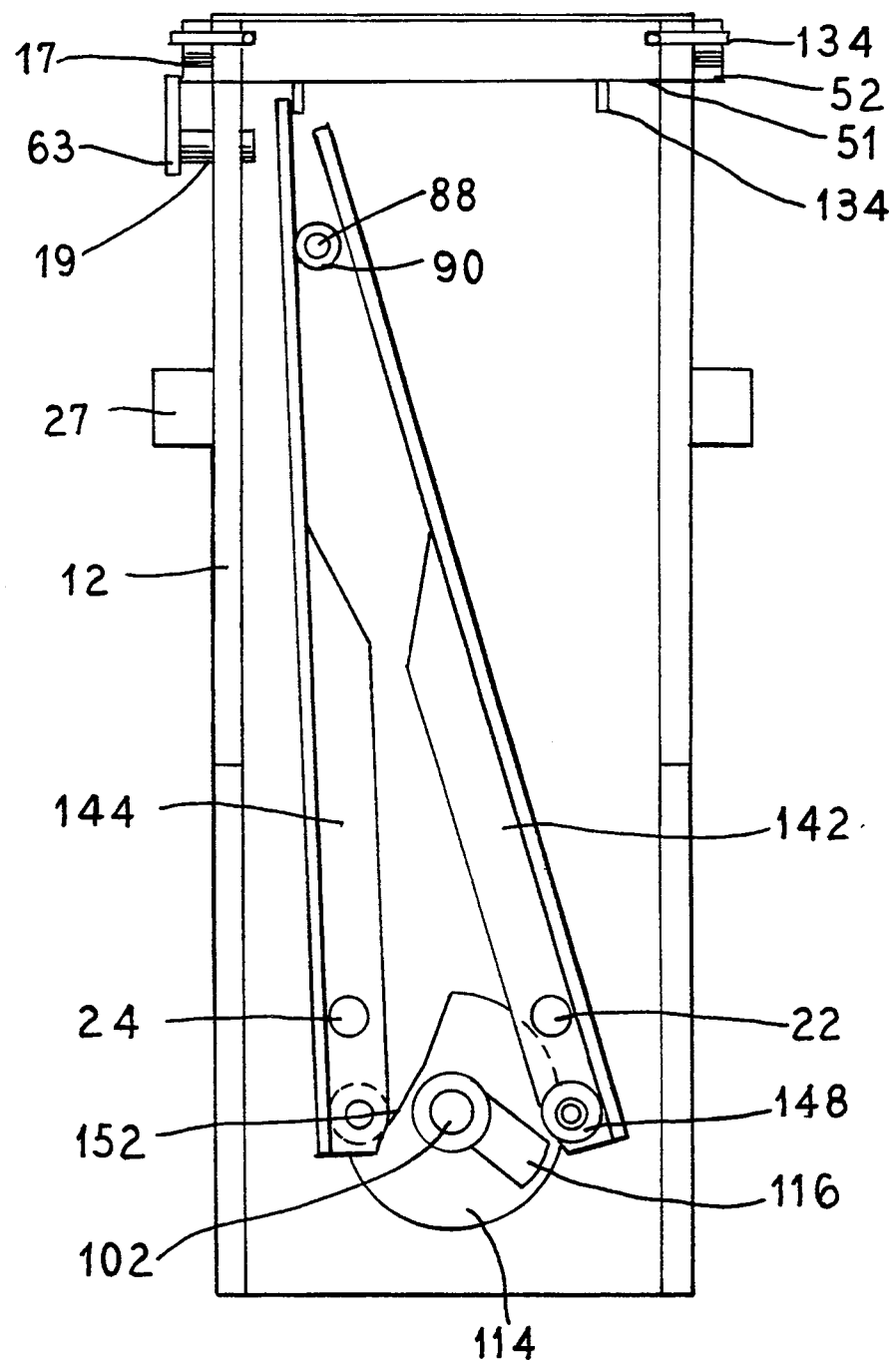

When the wiper blade 86 has travelled to a position beyond the coffee residue 165 and the wiper bracket 84 is in the return position 94, the pull-down cam 112 engages the roller 124 of the pull-down frame 122 which acts upon the pull-down springs 132 to force the pull-down rods 126 and 128 to lower the H-frame 50, the upper chamber 58, and the wiper bracket 84 to a second elevated position where the wiper blade 86 is in contact with the filter 38 on top of the lower chamber 31. The wiper blade 86 is kept parallel to the lower chamber and in contact across the full length of the filter 38, allowing the wiper blade 86 to push the coffee residue 165 as shown in FIGS. 5A and 5B, and scrape the filter material 38 clean. The stub shaft 88 of the wiper bracket 84 engages the sleeve bearing 90 which then engages the top of the return lever 142. This causes the return lever 142 to rotate around the pivot shaft 22 and the return lever 142 is free to do so because the return cam 116 has a dwell so that it no longer acts upon the cam follower 148 of the return lever 142.

Once the wiper blade has traveled beyond the top surface of the lower chamber 31 to the stored position 92, the coffee residue falls into a residue container 166 and the upper chamber assembly 58 can be lowered to bring it in contact with the lower chamber 31 because the wiper bracket 84 and the wiper blade 86 are clear of the lower chamber and can be moved into the parked position. To do this, the pull-down cam 112 engages the roller 124 which forces the pull-down frame 122 to act upon the pull-down springs 132 which force the pull-down rods 126 and 128 downward, lowering the H-frame 50 so that the upper chamber 58 and the lower chamber 31 are held tightly together and kept pressed together by the pull-down springs 132. The lowering of the upper chamber 58 also lowers the wiper bracket 84 and the wiper 86 to the parked position hanging over the residue container 166.

The brewing cycle is now complete. The drive shaft 102 has made a complete rotation and the piston 43 has now returned to a position just above the opening 40 of the lower chamber 31 ready for the next cycle.

It has been discovered best to slow the wiper bracket 84 and wiper blade 86 on its travel from the return position as it approaches the stored position to avoid the flexed wiper blade 86 from flipping coffee grounds off the edge of the top plate 34.

Figure 8:
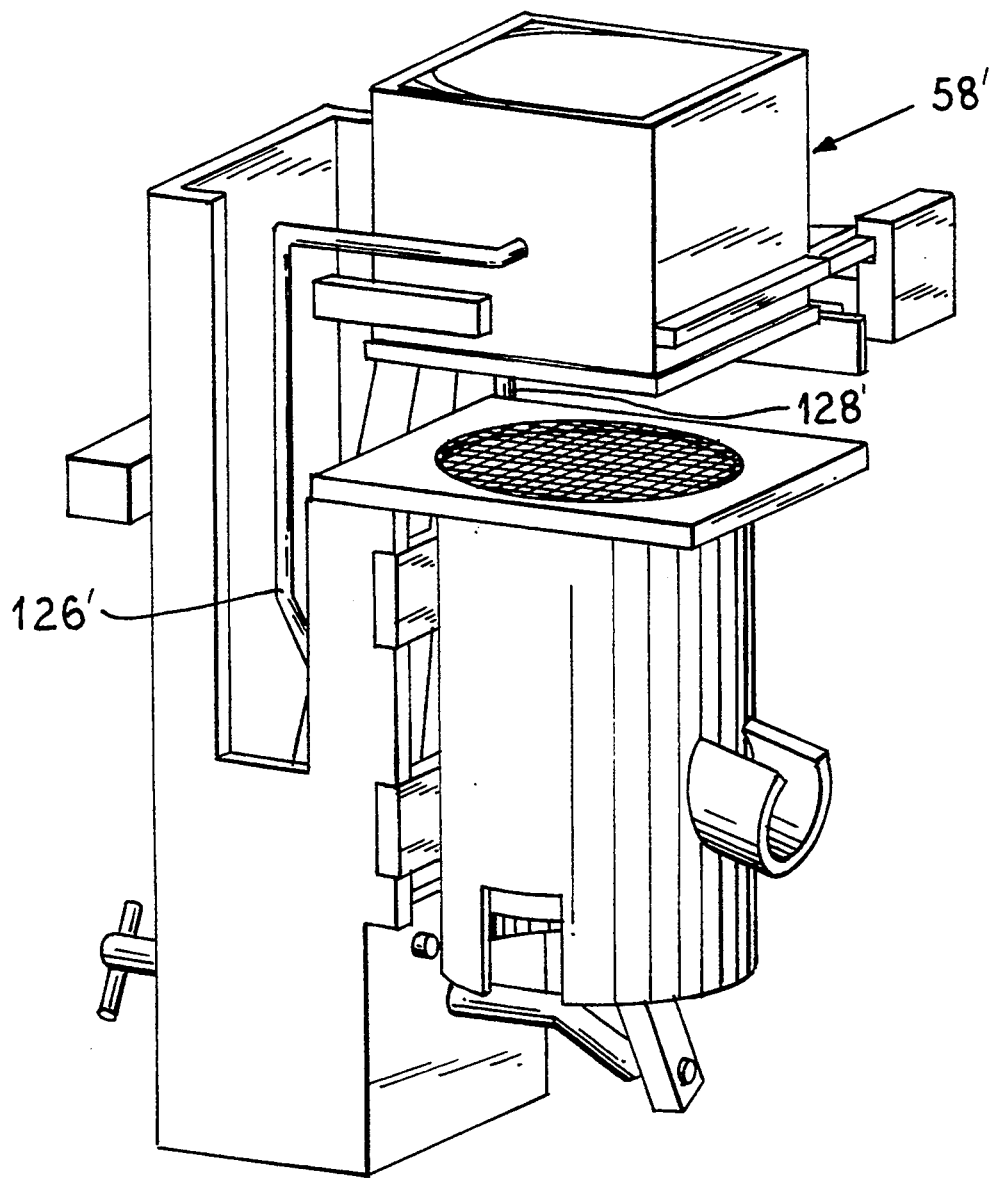
FIG. 8 is a perspective view of the brewing apparatus which shows an alternative embodiment of the invention where the upper chamber 58' is attached directly to the pull-down rods 126' and 128'.

FIG. 8 shows another alternative embodiment of the invention which would be to attach the upper chamber 58' directly to the pull-down rods 126' and 128'. This approach requires large structural pull-down rods to center the upper chamber. The H frame approach, however, is more simple to build and to service.

Figure 9:
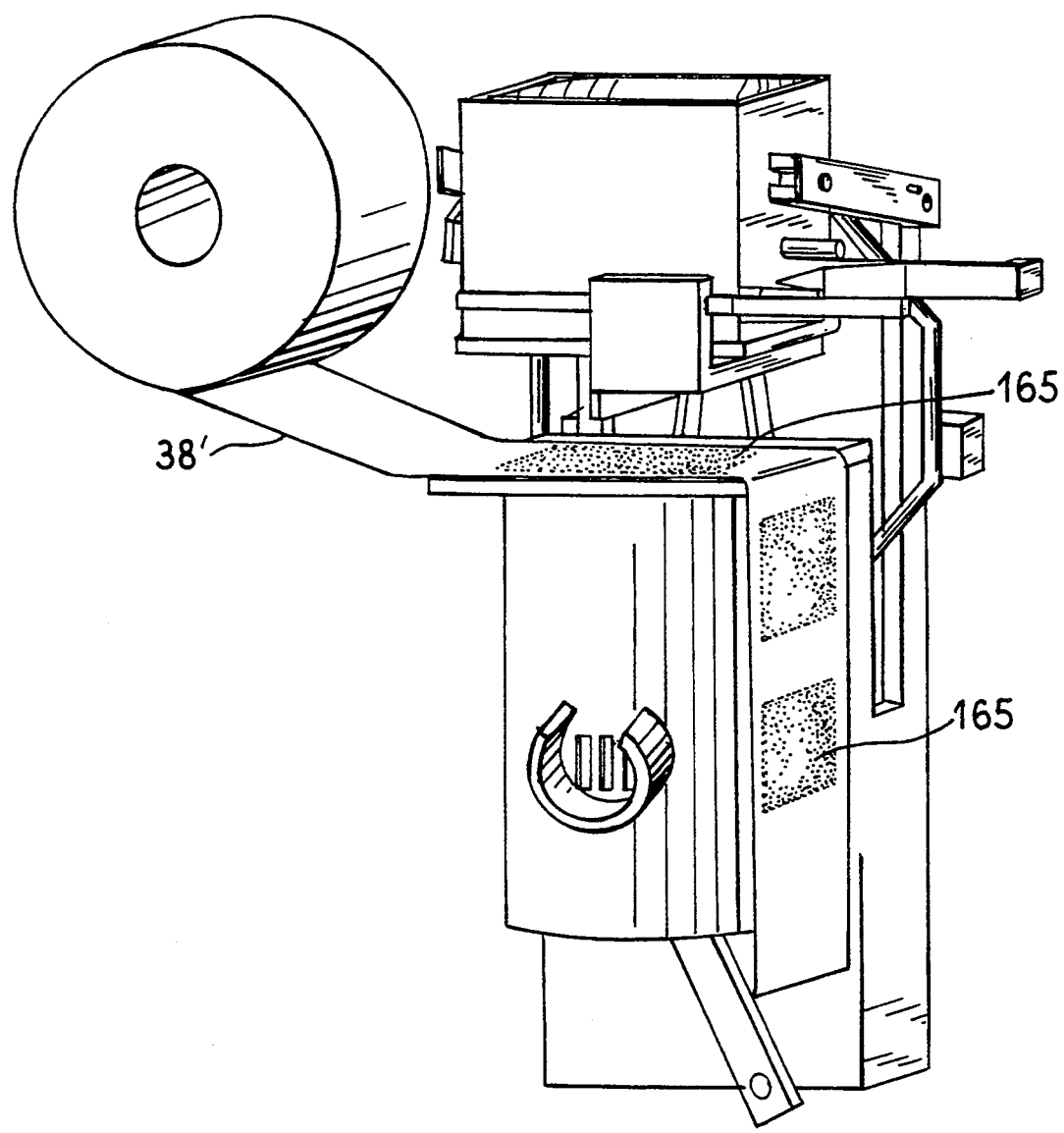
FIG. 9 is a view of an alternate use of the invention where a roll of filter paper is used as the filter element.

An alternative use of the invention is to allow a reusable paper filter 38' as shown in FIG. 9. A roll of filter paper 38' is threaded between the upper chamber assembly 58 and the lower chamber assembly 31. The liquid coffee is drawn through the filter paper 38' and the coffee residue remains on the filter paper. The used filter is then moved along by the wiper blade 86 and a new section of filter paper 38' is then clamped between the upper chamber assembly 58 and lower chamber assembly 31.

Figure 10:
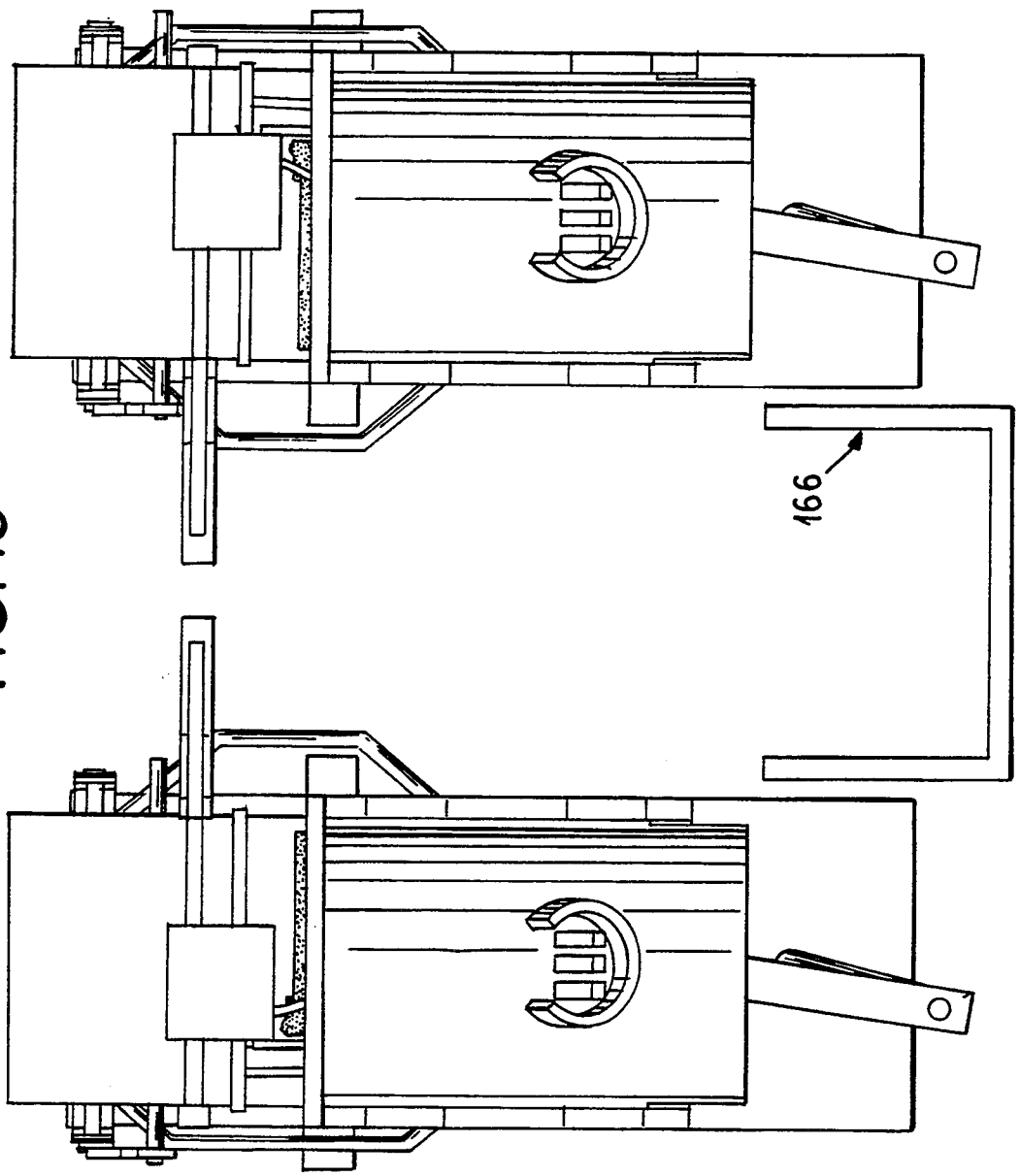
FIG. 10 is a view of two brewing mechanisms which have been assembled so that the coffee grounds fall into a central waste bucket.

FIG. 10 shows another alternative use of the invention that uses the upper chamber 58 and wiper bracket assembled backwards on the shaft 82 and guide 83. The drive assembly 100, the pull down assembly 120 and wiper assembly 140 are assembled differently so that the stored position of the wiper bracket 84 is now on the opposite side of the brewing machine and the wiper bracket travels in the opposite direction to the return position which is located on the side of the machine where the stored position was located in the prior figures. This alternative arrangement allows the coffee grounds to be disposed of on the opposite side of the brewing mechanism and permits two brewing mechanisms to sit close together beside each other in a machine while using a common residue container 166.

Still another alternative embodiment of the invention would be to attach the wiper to the H-frame 50 by an axial bearing which is attached to the H-frame. This construction allows the height of the wiper to be controlled by the H-frame position, and the wiper can still travel back and forth to clean the filter element. This implementation does not allow the wiper to remain parallel to the lower chamber and the filter and also does not allow the wiper to be removed for cleaning when the upper chamber is removed.

It can be seen that this invention provides an improved brewing machine whereby a reusable filter element is cleaned by a wiper which is positively driven by levers and without springs which are less reliable. The wiper drive system consists of very few moving parts which allows it to work reliably in a dirty area. The wiper blade travels back and forth very quickly which leaves a large portion of the cycle available for agitating the coffee and water and drawing the liquid coffee through the filter element. The upper chamber and wiper assembly can be rapidly detached from the brewing mechanism for easy cleaning. The wiper blade is parked below the surface of the lower chamber and above the waste container for the coffee grounds to that any excess liquid or solid coffee drips into the residue container. The mixing chute and spillage chute act together to mix the coffee and water efficiently and prevent coffee and water from being ejected from the brewing mechanism.

The preferred embodiment of the present invention can brew a cup of coffee in approximately 15 seconds. While the dimensions of various parts can be selected differently, the preferred embodiment of the invention has a 3.25 inch diameter piston which has a total travel in the cylinder of 3.75 inches. The following chart illustrates the key positions of the operating cycle in terms of the degrees of rotation of the drive shaft and the percentage of the overall cycle for each stage in the operation.

| Key positions of the operating cycle: | | | |
| --- | --- | --- | --- |
| | Start Position (degrees of rotation of shaft) | Stop Position (degrees of rotation of shaft) | Percent Of cycle % |
| Start of cycle with wiper parked | 0 | 190 | 53% |
| Wiper rises to clearance height | 190 | 210 | 6% |
| Wiper travels to return position | 210 | 240 | 8% |
| Wiper lowers to wipe height | 240 | 270 | 8% |
| Wiper wipes and travels to stored position | 270 | 320 | 14% |
| Wiper lowers to parked position | 320 | 350 | 8% |
| End of cycle with wiper parked | 350 | 360 | 3% |

A further modification of the invention is illustrated in FIGS. 11 through 15. In this embodiment, a single push rod 201 replaces the two arms 126 and 128 of the device of FIG. 1. Also, the horizontal sweep structure including the rollers for the scraper 86 have been moved relative to the embodiment illustrated in FIGS. 1–5 ahead of the single push rod 201. The upper end 200 of the push rod 201 has been bent outwardly so as to increase the mechanical advantage as it moves the arms 52 through the cross-piece 202.

Figure 11:
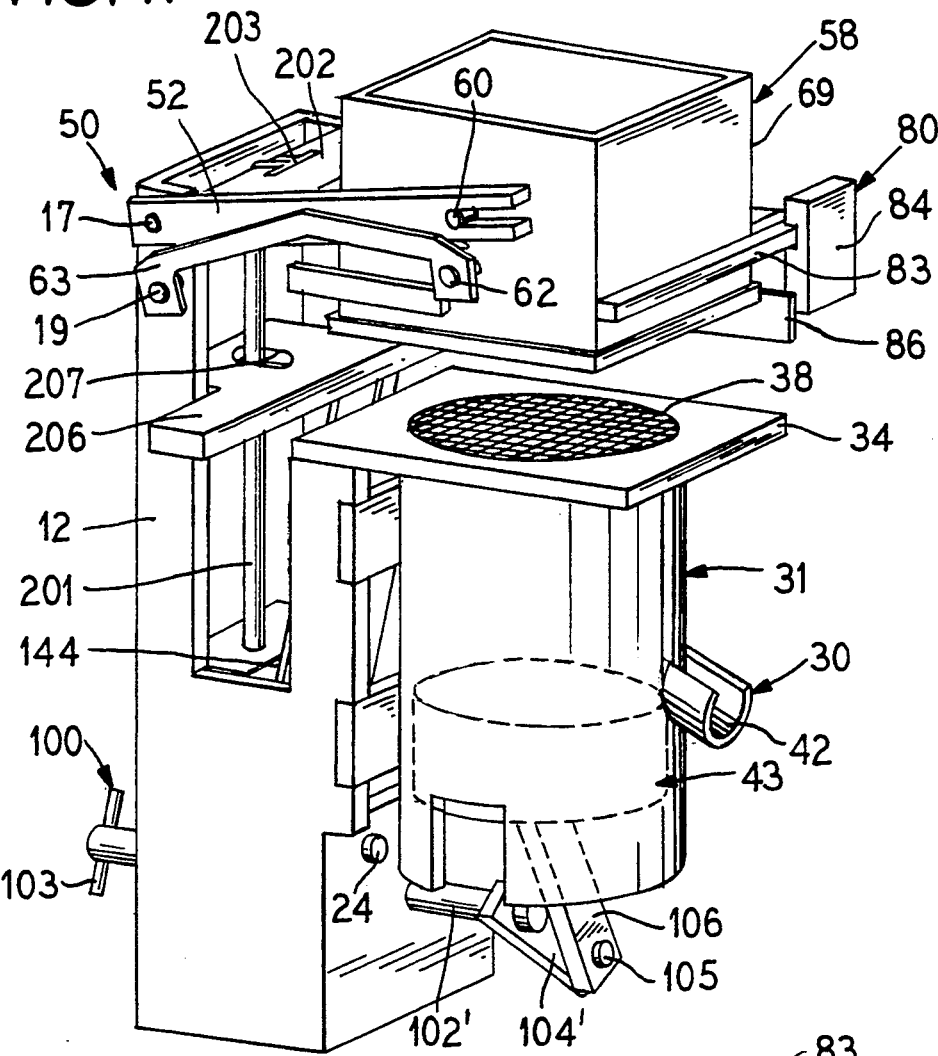
FIG. 11 is a perspective view of a modified form of the invention with a single push rod for the upper brewing chamber.
Figure 12:
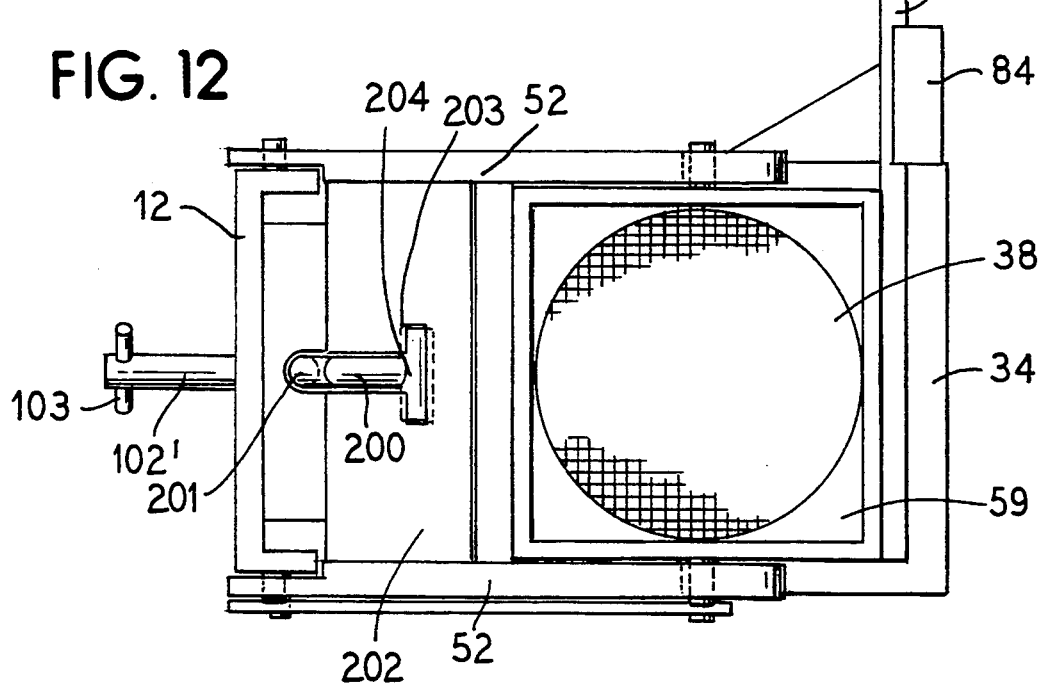
FIG. 12 is a top plan view of the device of FIG. 11.
Figure 13:
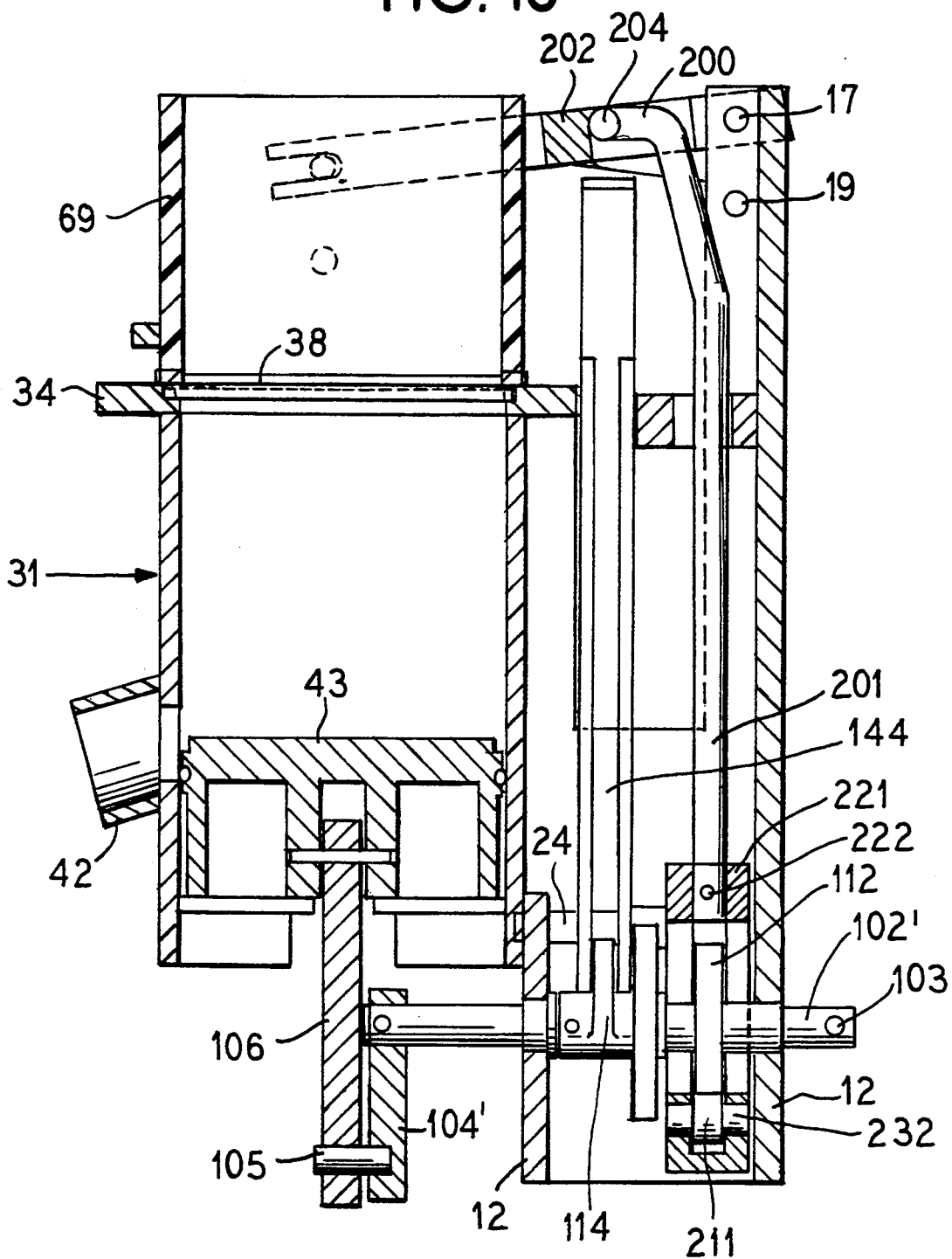
FIG. 13 is a sectional view illustrating the single push rod embodiment.
Figure 15:
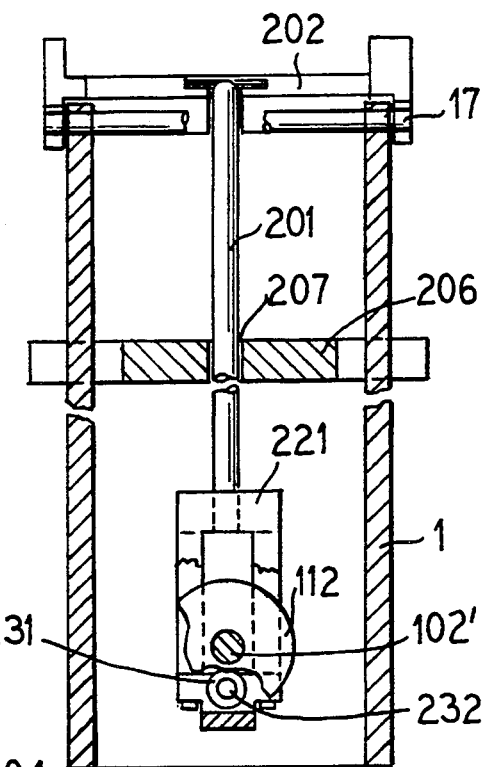
FIG. 15 is a sectional view.
Figure 14:
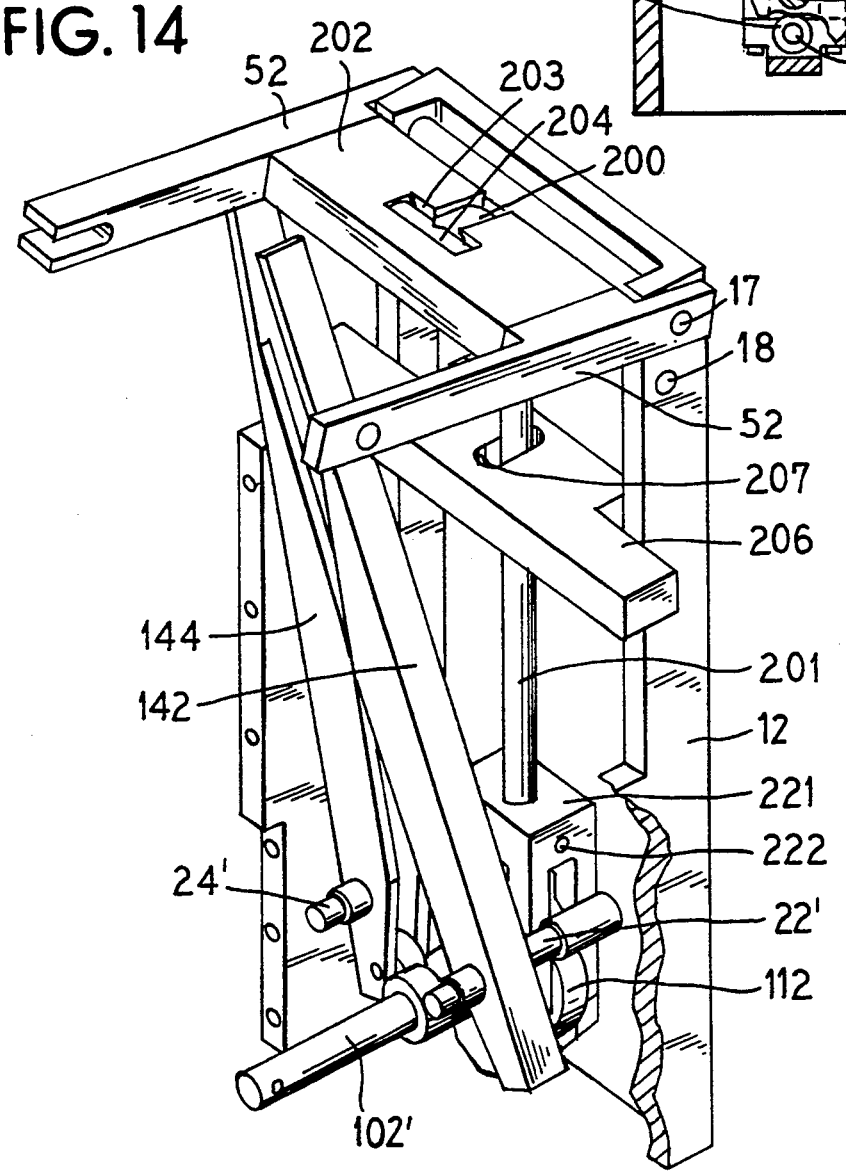
FIG. 14 is a cut-away sectional view of the device of FIG. 11.

FIG. 11 illustrates the push rod 201 which has an upwardly curved end 200 as shown in FIG. 13 which is connected in a T slot 203. The upper end 200 has a cross-member 204 which is received in the T slot 203 of the cross-member 202 which connects to the arms 52 as shown in FIGS. 11-15 so as to move them. Furthermore, the mechanism for driving the arms 142 and 144, which actuate the brush 86 have been moved forwardly so that cam 114 is to the left of cam 112 relative to FIG. 113 which constitutes a reversal of the orientation of these two cams from their mounting on shaft 102'. Shaft 102' carries the cams 112 and 114 and cam 112 is engaged by a cam follower 211 which is mounted on a shaft 232 mounted in a bracket 221 which is attached to the push rod 201 by a set screw 222 as shown in FIGS. 13 and 14 and as shown in FIGS. 13, 14 and 15 the cam follower 232 follows the surface of the cam 112 so as to control the position of the push rod 201 so as to selectively raise and lower the upper brewing chamber 69. The cam 114 moves the arms 142 and 144 about the shafts 22' and 24' in the same manner as the cam 114 moves arms 142 and 144 in the embodiment illustrated in FIGS. 1-5. However, the arms 142 and 144 have been moved forwardly relative to the embodiment of FIGS. 1-5.

The embodiment of FIGS. 11-15 provide a simple structure with fewer parts.

Moving the single push rod 201 behind the arms 142 and 144 which drive the wiper blade 86 results in a simpler arrangement. The wiper blade 86 moves in the same manner and performs the same function as in the embodiment of FIGS. 1-5.

Although the invention has been described with respect to preferred embodiments, it is not to be so limited as changes and modifications can be made which are within the full intended scope of the invention as defined by the appended claims.

We claim as our invention:

1. Apparatus for brewing a beverage comprising, in combination:
    an upper chamber for receiving and containing hot water and a brewing material and having an open lower end,
    a lower chamber having an open upper end,
    a filter mounted over the upper end of said lower chamber preventing passage of the brewing material therethrough,
    means for providing relative movement between said lower chamber and said upper chamber to move said chambers between a first position wherein said filter is clamped between said lower end of said upper chamber and said upper end of said lower chamber and a second position wherein said lower end of said upper chamber is spaced from said upper end of said lower chamber,
    means for removing brewing material off the top surface of said filter, and
    means for moving said removing means across said filter when said chambers are in said second position to remove brewing material from said filter, a moveable support member connected to said upper chamber and wherein said means for providing relative movement between said upper and lower chambers includes a push rod with one end pivotally connected to the center of said support member and wherein said push rod is aligned with the center of said upper chamber and said support member.

2. The apparatus of claim 1 including means for moving said removing means from a stored position on one side of said chambers to a return position on the opposite side of said chambers when said chambers are spaced apart by a wide distance sufficient for said removing means to move from said stored position to said return position without touching the beverage material on said filter and when said chambers are closer together than said wide distance to move said removing means in contact with said filter from said return position across said filter to said stored position to remove the brewing material off said filter.

3. The apparatus for brewing a beverage of claim 2 wherein said push rod is mounted so that it is not engaged by said means for moving said removing means.

4. The apparatus for brewing of claim 3 wherein said upper end of said push rod is curved.

5. The apparatus for brewing of claim 3 wherein said means for moving said removing means comprise a pair of arms pivotally mounted on horizontal shafts to move them in a vertical plane and said push rod is mounted so as to move vertically and wherein said means for moving said removing means includes a first cam driven by a motor and said means for providing relative movement between said lower chamber and said upper chamber includes a second cam driven by said motor.

6. The apparatus of claim 5 wherein said first cam is mounted closer to the front of said apparatus for brewing a beverage than said second cam.

7. The apparatus of claim 2 including means positioned below said stored position for collecting the brewing material.

8. The apparatus of claim 2 wherein said moving means includes means for moving said removing means at a slower rate as said removing means nears the stored position from the return position.

9. The apparatus of claim 8 including means for moving said removing means from a stored position on one side of said chambers to a return position on the opposite side of said chambers when said chambers are spaced apart by a distance sufficient for said removing means to move from said stored position to said return position without touching the beverage material on said filter and when said chambers are closer together to move said removing means in contact with said filter from said return position across said filter to said stored position to remove the brewing material off said filter.

10. The apparatus of claim 9 including a drive shaft, said means for moving said removing means connected to said drive shaft and elevating means connected to said drive shaft for first elevating said upper chamber relative to said lower chamber by a distance sufficient for said removing means to move from stored position to said return position without touching the beverage material on said filter and after said moving means has moved said removing means from said stored position to said removing position lowering said upper chamber to place said removing means in contact with said filter and after said moving means has moved said removing means from said return position to said stored position lowering said upper chamber to place said upper chamber in sealing contact with said filter.

11. The apparatus of claim 1 wherein said removing means includes a wiper blade.

12. The apparatus of claim 11 wherein said removing means includes a removal means projecting upwardly therefrom for cleaning the bottom of the upper chamber when said removing means moves between said stored and said return positions.

13. The apparatus of claim 11 including means for slidably mounting said wiper blade on said upper chamber.

14. The apparatus of claim 13 including means for slidable mounting said wiper blade on said upper chamber.

15. The apparatus of claim 14 including a pair of parallel spaced apart rods mounted on said upper chamber and having longitudinal axes perpendicular to the plane containing the vertical axis of the upper chamber for mounting said wiper blade for horizontal movement across the top of said filter.

16. The apparatus of claim 15 including means for moving said wiper blade from a stored position on one side of said upper chamber to a return position on the opposite side of said upper chamber when said chambers are spaced apart by a distance sufficient for the wiper blade to move from stored position to said return position without touching the beverage material on said filter and when said chambers are closer together to move said wiper blade from said return position in contact with said filter across said filter to said first side of said upper chamber to wipe the brewing material off said filter.

17. The apparatus of claim 16 including means positioned below said stored position for collecting the brewing material.

18. The apparatus of claim 16 wherein said movement means for moving said wiper blade move said wiper blade at a slower rate as it nears the stored position from the return position.

19. The apparatus of claim 15 including a wiper bracket slidably mounted on said rods and supporting said wiper blade there beneath and having a sleeved shaft projecting laterally therefrom and a return lever engaging said sleeved shaft to move said wiper bracket from said stored position to said return position and a wiper lever for engaging said sleeved shaft for moving said wiper bracket from said return position to said stored position.

20. The apparatus of claim 19 including a drive shaft with a return cam for engaging said return lever against said sleeved shaft to move said wiper bracket from the stored position to the return position and disengaging said return lever for movement of said wiper bracket back to said stored position and a wipe cam for engaging said wipe lever against said sleeved shaft to move said wiper bracket from said return position to said stored position and disengaging said wipe lever for movement of said wipe lever back to said return position whereby continuous rotation of said drive shaft in one direction positively moves said wiper assembly from said stored position to said return position and back to said stored position.

21. The apparatus of claim 11 wherein in said first position the longitudinal faces of said chambers are vertical and coaxial and said relative movement means includes means for moving said upper chamber upward while keeping the longitudinal axes of said chambers vertical and parallel.

* * * * *